(12) United States Patent
Matsuo et al.

(10) Patent No.: US 6,576,734 B1
(45) Date of Patent: Jun. 10, 2003

(54) MODIFIED POLYORGANOSILOXANE AND METHOD FOR PRODUCING IT

(75) Inventors: Takashi Matsuo, Kogoshima (JP); Youichi Kimae, Kumamoto (JP)

(73) Assignee: Chisso Corporation, Tokyo (JP)

( * ) Notice: Subject to any disclaimer, the term of this patent is extended or adjusted under 35 U.S.C. 154(b) by 0 days.

(21) Appl. No.: 09/723,892

(22) Filed: Nov. 28, 2000

(30) Foreign Application Priority Data

| Dec. 16, 1999 | (JP) | 11-357262 |
| Dec. 28, 1999 | (JP) | 11-372211 |
| Feb. 28, 2000 | (JP) | 2000-051043 |
| Aug. 22, 2000 | (JP) | 2000-250718 |

(51) Int. Cl.$^7$ .................. C08G 77/06; C08G 77/46
(52) U.S. Cl. ............. 528/25; 525/474; 528/26; 528/31; 556/437; 556/440
(58) Field of Search ............. 525/474; 528/25, 528/26, 31; 556/437, 440

(56) References Cited

U.S. PATENT DOCUMENTS

| 3,560,544 A | * | 2/1971 | Haluska .................. 556/437 |
| 5,166,244 A | | 11/1992 | Fukushima et al. |
| 5,296,625 A | * | 3/1994 | O'Lenick et al. .......... 554/77 |
| 5,360,571 A | * | 11/1994 | Kilgour et al. ........... 510/466 |
| 5,447,997 A | * | 9/1995 | Raleigh et al. ........... 525/474 |
| 5,852,065 A | * | 12/1998 | Frey et al. ............... 521/112 |

FOREIGN PATENT DOCUMENTS

| JP | 5139997 | 6/1993 |
| JP | 6100691 | 4/1994 |
| JP | 8109263 | 4/1996 |
| JP | 9059125 | 3/1997 |
| JP | 10001537 | 1/1998 |

\* cited by examiner

Primary Examiner—Robert Dawson
Assistant Examiner—Marc S Zimmer
(74) Attorney, Agent, or Firm—Fay, Sharpe, Fagan, Minnich & McKee, LLP

(57) ABSTRACT

Provided are modified carboxyl-terminated polyorganosiloxanes having a mean molecular weight of from 500 to 120,000 and represented by the following formula (1), and a method for producing them. The modified polyorganosiloxanes have a carboxyl group at one terminal position, and have a polyoxyalkylene moiety in the center of the molecular chain. They are highly miscible with various polar solvents and monomers. The method for producing them comprises reacting a polyorganosiloxane having a hydroxyl group at one terminal position and having a polyoxyalkylene moiety in the center of the molecular chain, with a cyclic acid anhydride having a specific structure, and it does not require plural reaction steps. In the method, various types of carboxyl-terminated polyorganosiloxanes can be easily produced, depending on the type of the cyclic acid anhydride used.

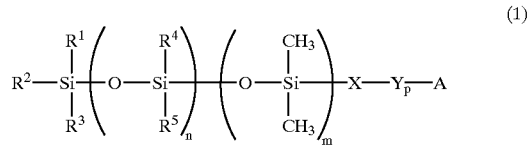

(1)

wherein $R^1$, $R^2$, $R^3$, $R^4$ and $R^5$ each represent a linear or branched alkyl group having from 1 to 20 carbon atoms, an aryl-containing group having from 6 to 10 carbon atoms, or a cycloalkyl group having from 4 to 10 carbon atoms; n and m each represent a number of 0, 1 or more; n+m indicates a number to satisfy the mean molecular weight, from 500 to 100,000, of the polysiloxane segments; X represents an alkylene group having from 2 to 20 carbon atoms; Y represents an oxyalkylene group having from 1 to 3 carbon atoms; p represents a number to satisfy the mean molecular weight, from 30 to 20,000, of the polyoxyalkylene segments $Y_p$; and A represents a substituent having from 1 to 6 carboxyl groups.

18 Claims, 26 Drawing Sheets

MODIFIED POLYORGANOSILOXANE AND METHOD FOR PRODUCING IT

BACKGROUND OF THE INVENTION

1. Field of the Invention

The present invention relates to a polyorganosiloxane with a carboxyl group at one terminal position, and to a method for producing it. Precisely, the invention relates to a modified carboxyl-terminated polyorganosiloxane which has a polyoxyalkylene segment between the carboxyl group at one terminal position and the polyorganosiloxane segment, and to a method for producing it.

2. Description of the Related Art

As having good weather resistance, surface water repellency, surface smoothness and lubricity, polyorganosiloxanes have many applications as modifiers for various polymers. For modifying polymer fibers, for example, employed are (1) a method of applying a polyorganosiloxane emulsion onto the fiber surface to improve the surface smoothness of the fibers; and (2) a method of kneading a polyorganosiloxane with a polymer such as polyester or the like followed by forming the resulting blend into fibers, to thereby modify the surface characteristics of the fibers.

In the method of applying a polyorganosiloxane onto the fiber surface, however, it is known that the polyorganosiloxane often peels off from the fiber surface owing to the friction between the fibers inevitable therein, whereby the surface smoothness of the fibers is lowered. On the other hand, the method of kneading a polyorganosiloxane with a polymer such as polyester or the like is also problematic in that the polyester and the polyorganosiloxane are difficult to uniformly mix since their miscibility is poor, and that the polyorganosiloxane often bleeds out on the polymer fibers. In the two methods, therefore, the surface smoothness of the fibers could be improved only temporarily.

Of polyorganosiloxanes, those having a functional group are effective as modifiers for various polymers. For example, such a polyorganosiloxane is used as a component for copolymerization or polycondensation with a polymer, to thereby make the resulting polymer have weather resistance, surface water repellency, lubricity, bio-compatibility and gas permeability characteristic of the organopolysiloxane used.

For modifying polymers, known are polyorganosiloxanes having various organic functional groups. For example, polyorganosiloxanes having a carboxyl group, such as those modified by carboxyl group at one terminal position, are useful as fiber-processing agents, emulsifiers, surface modifiers for inorganic materials, and also modifiers for various resins such as epoxy resins, polyesters, alkyd resins, urethane resins, etc.

Utilizing the reactivity of the carboxyl group therein, various additional functional groups may be introduced into the modified polyorganosiloxanes to produce different polyorganosiloxanes having various functional groups. For example, the carboxyl group may be amidated or esterified. In that manner, polyorganosiloxanes modified by carboxyl group at one terminal position can be utilized for preparing various types of modified silicones.

Japanese Patent Laid-Open No. 001537/1998 discloses modification of polyesters with polyorganosiloxanes that are modified by carboxylation at both terminal position; and Japanese Patent Publication No. 068424/1995 discloses a technique of using a carboxyl group-containing polyorganosiloxane for improving the cold resistance of an acrylic rubber composition and a technique of using the acrylic rubber composition for improving the mold releasability and the roll workability of acrylic rubber.

Japanese Patent Laid-Open No. 059125/1997 discloses a technique of coating the surface of a powder for cosmetics with a carboxyl group-containing polyorganosiloxane to thereby make the powder repel water.

Japanese Patent Laid-Open No. 109263/1996 discloses a technique of converting a polyorganosiloxane modified by carboxylation at both terminal position and side chain carboxylation into a polyvalent metal salt-modified polyorganosiloxane, and using it as a gelling agent or for cosmetics.

Japanese Patent Laid-Open No. 139997/1993 discloses a technique of using a carboxyl group-containing polyorganosiloxane for an endermic absorption promoter.

Such useful modified polyorganosiloxanes with a carboxyl group at one terminal position, can be produced in various methods mentioned below. For example, one method for producing them comprises adding an unsaturated carboxylate to a polydimethylsiloxane with an SiH group at one terminal position, through hydrosilylation in the presence of a platinum catalyst, followed by hydrolyzing the ester group in the resulting adduct into a carboxyl group; and another method comprises adding a silyl ester of an unsaturated carboxylic acid to a polydimethylsiloxane with an SiH group at one terminal position, through hydrosilylation in the presence of a platinum catalyst, followed by processing the resulting adduct with water or an alcohol to remove the silyl group from it to thereby make it have a carboxyl group.

As mentioned hereinabove, the usefulness of carboxyl-modified polyorganosiloxanes is obvious.

However, the conventional methods require three reaction steps including a step of protecting the carboxyl group with a silyl group prior to hydrosilylation, since the carboxyl group interferes with the hydrosilylation. Accordingly, it is desired to produce modified polyorganosiloxanes with a carboxyl group at one terminal position in one-step reaction. In addition, the conventional, carboxyl group-containing polyorganosiloxanes are problematic in that their miscibility with various solvents is low, and their applications are limited.

SUMMARY OF THE INVENTION

The present invention is to solve the prior art problems noted above, and its object is to provide a polyorganosiloxane with a carboxyl group at one terminal position, having a polyoxyalkylene moiety in the center of its molecular chain, and to provide a method for producing it in one-step reaction.

We, the present inventors have assiduously studied so as to solve the above-mentioned prior art problems. As a result, we have found that a polyorganosiloxane with a carboxyl group at one terminal position and having a polyoxyalkylene moiety in the center of its molecular chain is highly miscible with various polar solvents and monomers. In addition, we have found a novel method for producing the modified polyorganosiloxane, which comprises reacting a polyorganosiloxane with a hydroxyl group at one terminal position and having a polyoxyalkylene moiety in the center of its molecular chain, with a cyclic acid anhydride having a specific structure. The method does not require plural reaction steps, and according to the method, it is easy to produce different types of carboxyl-terminated polyorganosiloxanes at one terminal position in different modes depending on the type of the starting cyclic acid anhydride used. On the basis of these findings, we have completed the present invention.

1. A modified carboxyl-terminated polyorganosiloxane having a mean molecular weight of from 500 to 120,000 and represented by the following general formula (1):

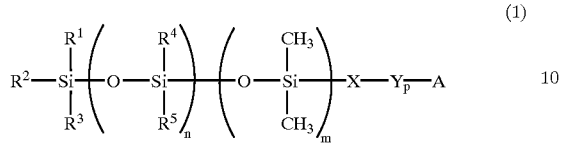

(1)

wherein $R^1$, $R^2$, $R^3$, $R^4$, and $R^5$ each represent a linear or branched alkyl group having from 1 to 20 carbon atoms, an aryl-containing group having from 6 to 10 carbon atoms, or a cycloalkyl group having from 4 to 10 carbon atoms; n and m each represent a number of 0, 1 or more; n+m indicates a number to satisfy the mean molecular weight, from 500 to 100,000, of the polysiloxane segment; X represents an alkylene group having from 2 to 20 carbon atoms; Y represents an oxyalkylene group having from 1 to 3 carbon atoms; p represents a number to satisfy the mean molecular weight, from 30 to 20,000, of the polyoxyalkylene segment $Y_p$; and A represents a substituent having from 1 to 6 carboxyl groups.

2. The modified carboxyl-terminated polyorganosiloxane of above item 1, wherein p is a number to satisfy the mean molecular weight, from 120 to 20,000, of the polyoxylalkylene segment $Y_p$.

3. The modified carboxyl-terminated polyorganosiloxane of above item 1, wherein A is a substituent Z having from 1 to 3 carboxyl groups.

4. The modified carboxyl-terminated polyorganosiloxane of above item 1, wherein A is a substituent of the following general formula (2):

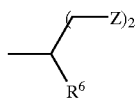

(2)

wherein $R^6$ represents a hydrogen atom, a linear or branched alkyl group having from 1 to 5 carbon atoms, or an aryl group having from 6 to 10 carbon atoms; and Z represents a substituent having from 1 to 3 carboxyl groups.

5. The modified carboxyl-terminated polyorganosiloxane of above items 3 or 4, wherein Z is a substituent of the following general formula (3):

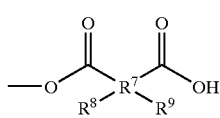

(3)

wherein $R^7$ represents a polyvalent alkyl-, alkenyl, aryl, or arylalkyl radical that may optionally contain functional groups selected from carbonyl groups, sulfone groups, ethereal oxygen groups, amine groups, and trifluoromethyl groups; and $R^8$ and $R^9$ each represent a hydrogen atom or a carboxyl group.

6. The modified carboxyl-terminated polyorganosiloxane of above items 3 or 4, wherein Z is a substituent of the following general formula (4):

(4)

wherein $R^7$ represents a polyvalent alkyl-, alkenyl, aryl, or arylalkyl radical that may optionally contain functional groups selected from carbonyl groups, sulfone groups, ethereal oxygen groups, amine groups, and trifluoromethyl groups.

7. The modified carboxyl-terminated polyorganosiloxane of above items 1 or 2, where Y is $-OCH_2-$, $-OCH(CH_3)-$, $-OCH_2CH_2-$, $-OCH(CH_3)CH_2-$, or $-OCH_2CH(CH_3)-$; and X is an alkylene group having from 2 to 5 carbon atoms.

The method of the invention for producing a modified carboxyl-terminated polyorganosiloxane includes the following items 8 to 14:

8. A method for producing a modified carboxyl-terminated polyorganosiloxane of the following general formula (1), which comprises reacting a silicone with a hydroxyl group at one terminal position and represented by the following general formula (5), with at least one acid anhydride selected from the group of the compounds of the following general formulae (6), (7) and (8), in the presence of a catalyst:

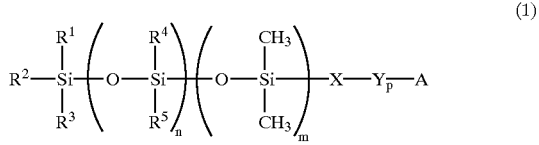

(1)

wherein $R^1$, $R^2$, $R^3$, $R^4$, and $R^5$, each represent a linear or branched alkyl group having from 1 to 20 carbon atoms, an aryl-containing group having from 6 to 10 carbon atoms, or a cycloalkyl group having from 4 to 10 carbon atoms; n and m each represent a number of 0, 1 or more; n+m indicates a number to satisfy the mean molecular weight, from 500 to 100,000, of the polysiloxane segment; X represents an alkylene group having from 2 to 20 carbon atoms; Y represents an oxyalkylene group having from 1 to 3 carbon atoms; p represents a number to satisfy the mean molecular weight, from 30 to 20,000, of the polyoxyalkylene segment $Y_p$; and A represents a substituent having from 1 to 6 carboxyl groups,

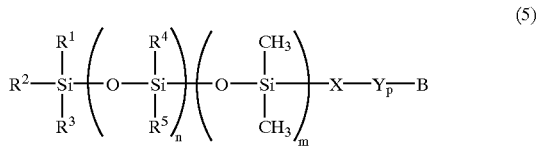

(5)

wherein $R^1$, $R^2$, $R^3$, $R^4$, and $R^5$ each represent a linear or branched alkyl group having from 1 to 20 carbon atoms, an aryl-containing group having from 6 to 10 carbon atoms, or a dycloalkyl group having from 4 to 10 carbon atoms; n and m each represent a number of 0, 1 or more, n+m indicates a number to satisfy the mean molecular weight, from 500 to 100,000, of the polysiloxane segment; X represents an alkylene group having from 2 to 20 carbon atoms; Y represents an oxyalkylene group having from 1 to 3 carbon atoms; p represents a number to satisfy the mean molecular weight, from 30 to 20,000, of the polyoxyalkylene segment Yp; and B represents a substituent having one or two hydroxyl groups,

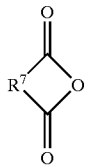
(6)

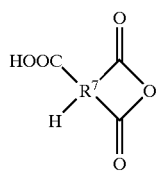
(7)

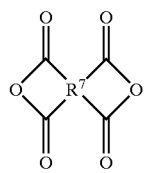
(8)

wherein $R^7$ represents a polyvalent alkyl-, alkenyl, aryl, or arylalkyl radical that may optionally contain functional groups selected from carbonyl groups, sulfone groups, ethereal oxygen groups, amine groups, and trifluoromethyl groups.

9. The method for producing a modified carboxyl-terminated polyorganosiloxane of above item 8, wherein p is a number to satisfy the mean molecular weight, from 120 to 20,000, of the polyoxyalkylene segment Yp.

10. The method for producing a modified carboxyl-terminated polyorganosiloxane of above item 8, wherein A is a substituent Z having from 1 to 3 carboxyl groups, and B is a hydroxyl group.

11. The method for producing a modified carboxyl-terminated polyorganosiloxane of above item 8, wherein A is a substituent of the following general formula (2), and B is a substituent of the following general formula (9):

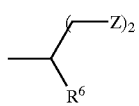
(2)

wherein $R^6$ represents a hydrogen atom, a linear or branched alkyl group having from 1 to 5 carbon atoms, or an aryl group having from 6 to 10 carbon atoms; and Z represents a substituent having from 1 to 3 carboxyl groups,

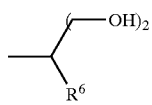
(9)

wherein $R^6$ represents a hydrogen atom, a linear or branched alkyl group having from 1 to 5 carbon atoms, or an aryl group having from 6 to 10 carbon atoms.

12. The method for producing a carboxyl-terminated, modified polyorganosiloxane of above items 10 or 11, wherein Z is a substituent of the following general formula (3):

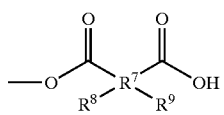
(3)

wherein $R^7$ represents a polyvalent alkyl-, alkenyl, aryl, or arylalkyl radical that may optionally contain functional groups selected from carbonyl groups, sulfone groups, ethereal oxygen groups, amine groups, and trifluoromethyl groups; and $R^8$ and $R^9$ each represent a hydrogen atom or a carboxyl group.

13. The method for producing a modified carboxyl-terminated polyorganosiloxane of above items 10 or 11, wherein Z is a substituent of the following general formula (4):

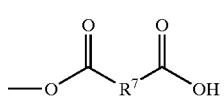
(4)

wherein $R^7$ represents a polyvalent alkyl-, alkenyl, aryl, or arylalkyl radical that may optionally contain functional groups selected from carbonyl groups, sulfone groups, ethereal oxyqen groups, amine groups, and trifluoromethyl groups.

14. The method for producing a modified carboxyl-terminated polyorganosiloxane of above item 8, wherein Y is $-OCH_2-$, $-OCH(CH_3)-$, $-OCH_2CH_2-$, $-OCH(CH_3)CH_2-$, or $-OCH_2CH(CH_3)-$; and X is an alkylene group having from 2 to 5 carbon atoms.

DESCRIPTION OF THE PREFERRED EMBODIMENTS

Figure 1:
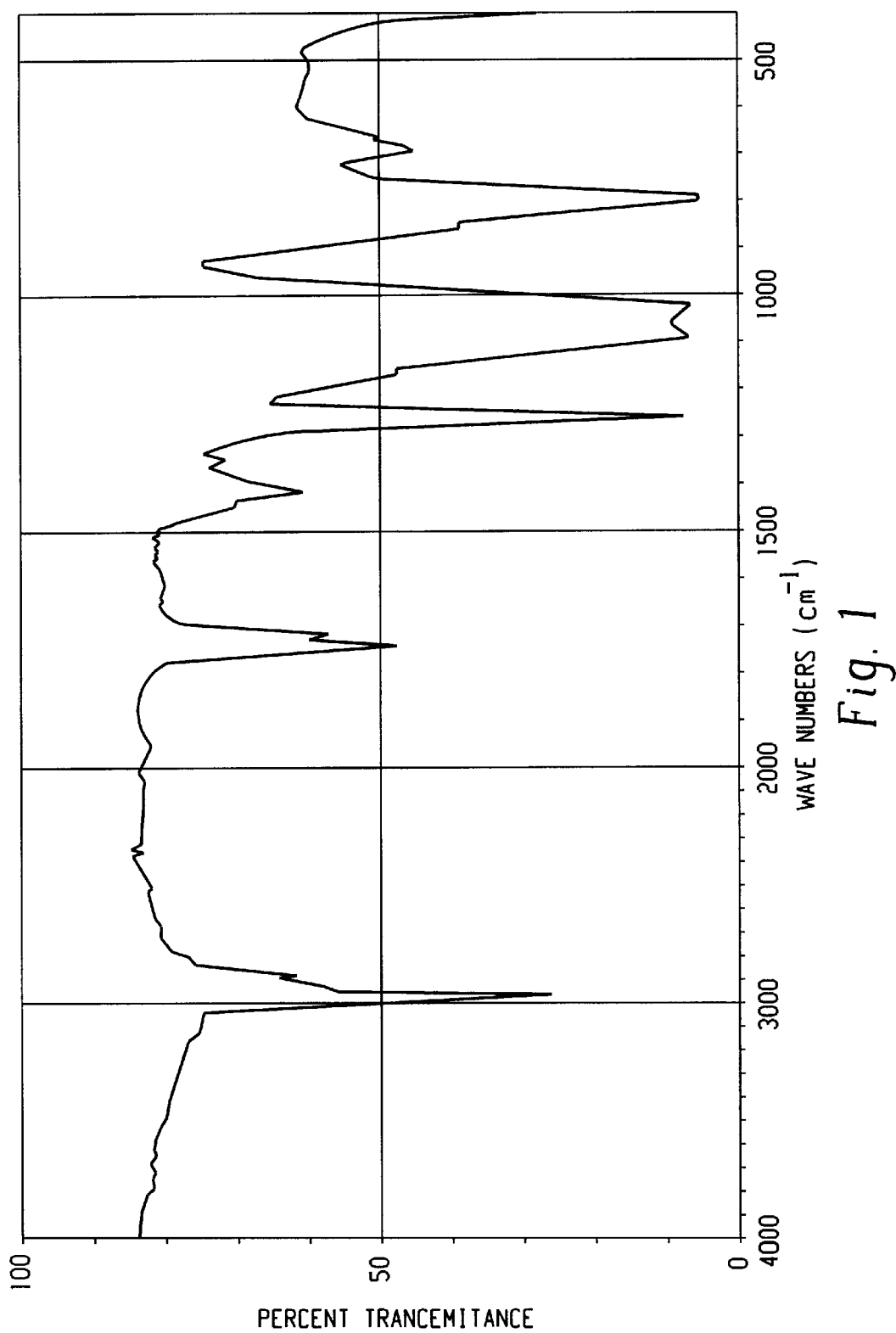
FIG. 1 is an IR spectral chart of the modified polyorganosiloxane with a carboxyl group at one terminal position in Example 1.

The modified polyorganosiloxane of the invention is represented by the above-mentioned general formula (1). This is described more concretely. In formula (1), $R^1$, $R^2$, $R^3$, $R^4$ and $R^5$ each represent an alkyl group having from 1 to 20 carbon atoms, an aryl-containing group having from 6 to 10 carbon atoms, or a cycloalkyl group having from 4 to 10 carbon atoms. These are described concretely hereinunder. The alkyl group having from 1 to 20 carbon atoms is a linear or branched alkyl group, including, for example, methyl, ethyl, n-propyl, i-propyl, n-butyl, i-butyl, s-butyl, t-butyl, pentyl, neopentyl, hexyl, heptyl, octyl, nonyl, decyl, undecyl and dodecyl groups. The cycloalkyl group having from 4 to 10 carbon atoms includes, for example, cyclopentyl and cyclohexyl groups. The aryl-containing group having from 6 to 10 carbon atoms includes, for example, phenyl, toluyl, xylyl, ethylphenyl, benzyl and phenethyl groups.

Of those mentioned above, $R^1$, $R^3$, $R^4$ and $R^5$ are preferably methyl groups, and $R^2$ is preferably a methyl or butyl group.

In formula (2), the linear or branched alkyl group having from 1 to 5 carbon atoms for $R^6$ includes, for example, methyl, ethyl, n-propyl, i-propyl, n-butyl i-butyl, s-butyl, t-butyl, pentyl and neopentyl groups. The aryl group having from 6 to 10 carbon atoms therein includes, for example, phenyl, toluyl, xylyl, ethylphenyl, and carboxyphenyl groups. Preferably, $R^6$ is a hydrogen atom, a methyl group or an ethyl group.

In formula (1), the alkylene group having from 2 to 20 carbon atoms for X may be a linear or branched alkylene group, including, for example, ethylene, trimethylene, tetramethylene, pentamethylene, hexamethylene, heptamethylene, octamethylene, nonamethylene, decamethylene, undecamethylene, dodecamethylene, tetradecamethylene, 2-methylethylene, 2-methyltrimethylene, 2-methyltetramethylene, 2-methylpentamethylene, 2-methylhexamethylene, 2-methylheptamethylene, 2-methyloctamethylene, 2-methylnonamethylene, 2-methyldecamethylene and 2-methylundacamethylene groups Preferred is an alkylene group having from 2 to 5 carbon atoms; and more preferred is a trimethylene or 2-methylethylene group (having 3 carbon atoms).

Yp indicates a polyoxyalkylene segment, in which p indicates a mean degree of polymerization of the segment, and is a number to satisfy the mean molecular weight, from 30 to 200,000, of the polyoxyalkylene segment Yp. Preferably, p falls between 1 and 460. More preferably, p is a number to satisfy the mean molecular weight, from 120 to 20,000, of the polyoxyalkylene segment Yp. The oxyalkylene group having from 1 to 3 for Y may be —OCH$_2$—, —OCH$_2$CH$_2$—, —OCH(CH$_3$)CH$_2$—, or —OCH$_2$CH(CH$_3$)—. Preferably, it is —OCH$_2$— (having one carbon atom), or —OCH$_2$CH$_2$— (having 2 carbon atoms).

n and m each represent a number of 0, 1 or more; and n+m indicates a mean degree of polymerization of the polysiloxane segment, and is a number to satisfy the mean molecular weight, from 500 to 100,000, of the polysiloxane segment. Preferably, this falls between 4 and 1100.

The mean molecular weight of the modified polyorganosiloxane of the invention is not specifically defined, but preferably falls between 500 and 120,000.

The substituent Z has from 1 to 3 carboxyl groups, and may be represented by the following general formula (3) or (4):

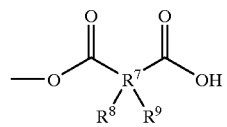
(3)

wherein $R^8$ and $R^9$ each represent a hydrogen atom or a carboxyl group,

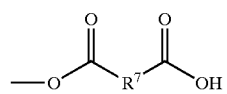
(4)

These formulae (3) and (4) are described more concretely. $R^7$ represents a residue of a dicarboxylic or tetracarboxylic acid from which two or four carboxyl groups are removed. Hereinunder shown are some examples of the residues of dicarboxylic acid anhydrides from which the carboxyl groups are removed.

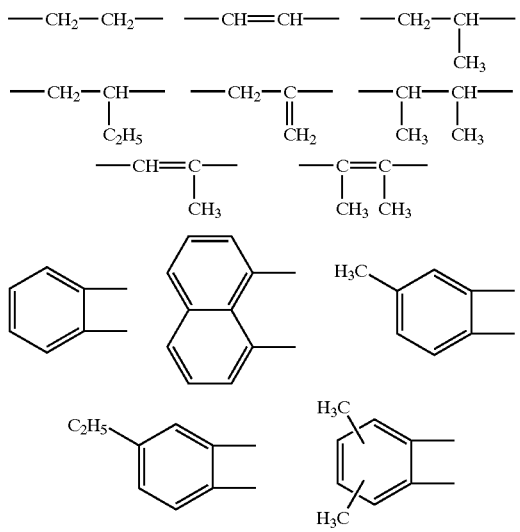

Of these, the following residues are preferred in the invention.

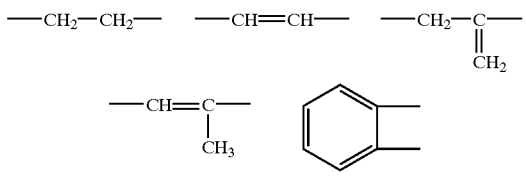

The following structural formulae are examples of the residues of tetracarboxylic acid anhydrides from which the carboxyl groups are removed.

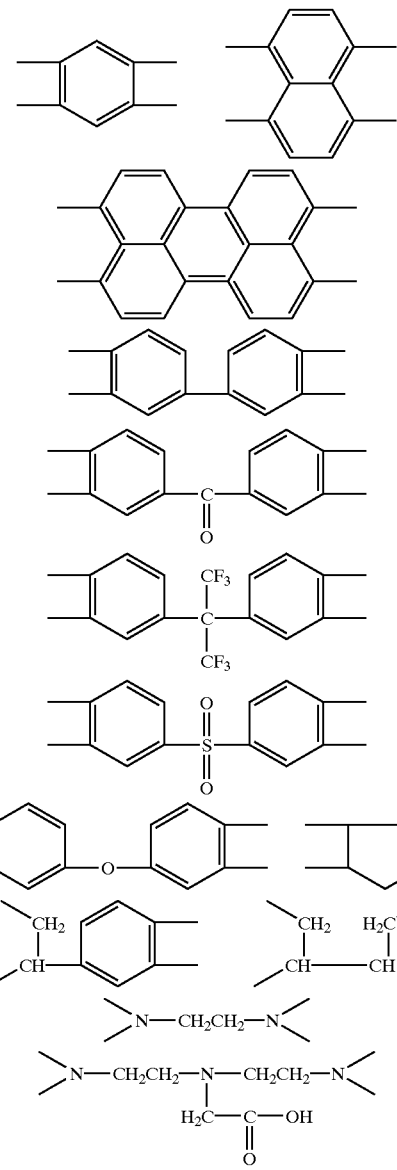

In the invention, the following residue is preferred.

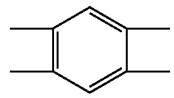

Next described in detail is the method of the invention for producing such a modified polyorganosiloxane with carboxyl group at one terminal position.

The modified polyorganosiloxane with carboxyl group at one terminal position and represented by formula (1) of the invention can be produced by reacting a silicone with a hydroxyl group at one terminal position and represented by formula (5) with at least one acid anhydride selected from the group of the compounds of the formulae (6), (7) and (8), in the presence of a catalyst.

The silicone with a hydroxyl group at one terminal position and represented by formula (5) is available on the market. For example, commercial products of a silicone with a monohydroxyl group at one terminal position {of formula (5-a)} are Chisso's FM-0411, FM-0421 and FM-0425. Commercial products of a silicone with a dihydroxyl group at one terminal position {of formula (5b)} are Chisso's FM-DA11, FM-DA21 and FM-DA26.

Compounds of formula (5) not available on the market can be produced, for example, by reacting a polysiloxane with an SiH group at one terminal position and represented by the following general formula (10) with a polyoxyalkylene having an alkenyl group and represented by the following general formula (11) or (12), according to the following reaction formula (a) or (b):

Reaction Formula (a):

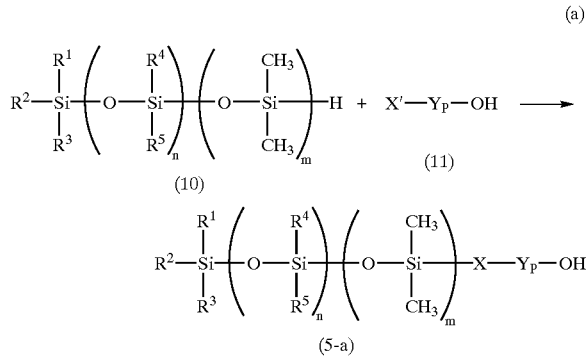

Reaction Formula (b):

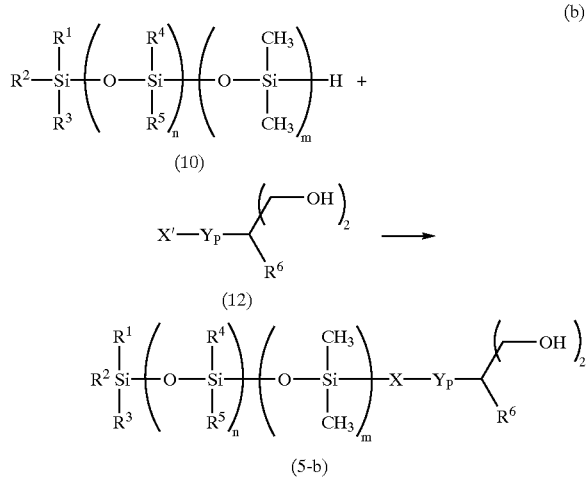

wherein $R^1$, $R^2$, $R^3$, $R^4$, $R^5$, $R^6$, n, m, n+n, X, Y and p have the same meanings as above; and X' represents an alkenyl group having from 2 to 20 carbon atoms.

The reaction of formulae (a) and (b) is hydrosilylation to be effected in the presence of a catalyst. The catalyst may be a transition metal catalyst generally used in hydrosilylation. Concretely, it includes metal compounds with any of platinum, rhodium, iridium, ruthenium, palladium, molybdenum, manganese and the like.

The catalyst may be in any form dissolved in a solvent (as a homogenized catalyst) or held on a carrier such as carbon or silica (as an supported catalyst), or may be combined with a promoter such as phosphine, amine, potassium acetate or the like.

The reaction systems (a) and (b) do not always require a reaction solvent, but, if desired, a suitable solvent not interfering with the reaction may be added thereto. Concretely, the solvent includes aliphatic hydrocarbons such as hexane, heptane, etc.; aromatic hydrocarbons such as benzene, toluene, xylene, etc.; ethers such as diethyl ether, tetrahydrofuran (THF), dioxane, etc.; halogenohydrocarbons such as methylene chloride, carbon tetrachloride, etc.; alcohols such as methanol, ethanol, propanol, etc.; and water. One or more of these solvents may be used either singly or as combined.

The reaction temperature for hydrosilylation is not specifically defined, but, in general, it is not higher than the boiling point of the reaction solvent used. In case where the reaction is effected in the absence of a solvent, the temperature for it may fall between 0 and 250° C., but preferably between 20 and 120° C. in view of the economical aspect.

The polyoxyalkylenes of formulae (11) and (12) having a hydroxyl group at one terminal position and a vinyl group at the other terminal position are available on the market. Concretely, they are ethylene glycol monoallyl ether (of formula (11) where X' is an allyl group, Y is —$OCH_2CH_2$—, and p is 1); diethylene glycol monoallyl ether (of formula (11) where X' is an allyl group, Y is —$OCH_2CH_2$—, and p is 2); triethylene glycol monoallyl ether (of formula (11) where X' is an allyl group, Y is —$OCH_2CH_2$—, and p is 3); propylene glycol monoallyl ether (of formula (11) where X' is an allyl group, Y is —$OCH(CH_3)CH_2$— or —$OCH_2CH(CH_3)$—, and p is 1); dipropylene glycol monoallyl ether (of formula (11) where X' is an allyl group, Y is —$OCH(CH_3)CH_2$— or —$OCH_2CH(CH_3)$—, and p is 2); and trimethylolpropane monoallyl ether (of formula (12) where $R^6$ is an ethyl group, X' is an allyl group, Y is —$OCH_2$—, and p is 1)

Other examples of the compounds are NOF Corporation's Uniox® PKA-5001 (polyethylene glycol monoallyl ether having a mean molecular weight of 200 and represented by formula (11) where X' is an allyl group, and Y is —$OCH_2CH_2$—); Uniox® PKA-5002 (polyethylene glycol monoallyl ether having a mean molecular weight of 400 and represented by formula (11) where X' is an allyl group and Y is —$OCH_2CH_2$—); Uniox® PKA-5003 (polyethylene glycol monoallyl ether having a mean molecular weight of 450 and represented by formula (11) where X' is an allyl group and Y is —$OCH_2CH_2$—); Uniox® PKA-5004 (polyethylene glycol monoallyl ether having a mean molecular weight of 750 and represented by formula (11) where X' is an allyl group and Y is —$OCH_2CH_2$—); Uniox® PKA-5005 (polyethylene glycol monoallyl ether having a mean molecular weight of 1500 and represented by formula (11) where X' is an allyl group and Y is —$OCH_2CH_2$—); Unisafe® PKA-5014 (polypropylene glycol monoallyl ether having a mean molecular weight of 1500 and represented by formula (11) where X' is an allyl group, and Y is —$OCH(CH_3)CH_2$— or —$OCH_2CH(CH_3)$—), etc.

The reaction of the silicone with a hydroxyl group at one terminal position and represented by formula (5) {formula (5-a) or (5-b)} with the acid anhydride of formula (7) or (8) in the method of producing the modified carboxyl-terminated polyorganosiloxane of the invention is described in detail hereinunder.

The reaction is monoesterification to be represented by any of the following reaction formulae (c), (d), (e), (f) (g) and (h); and the monoesterification may be effected in two methods.

Reaction Formula (c):
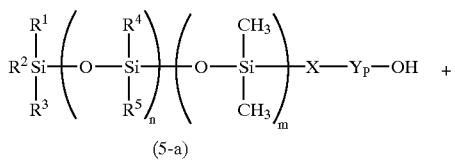
(5-a)
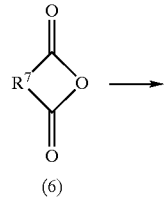
(6)
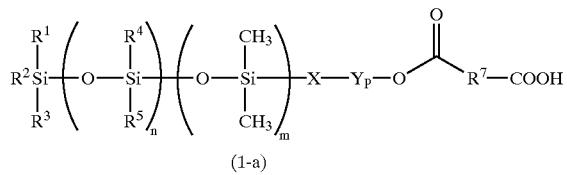
(1-a)
Reaction Formula (d):
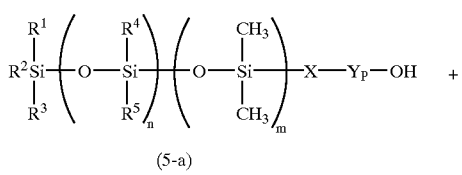
(5-a)
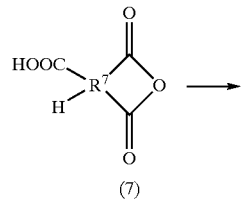
(7)
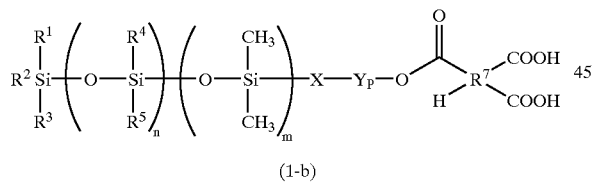
(1-b)
Reaction Formula (e):
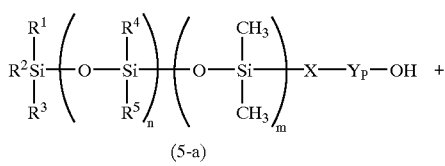
(5-a)
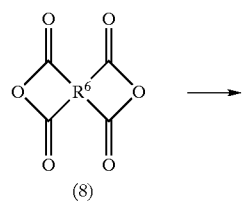
(8)
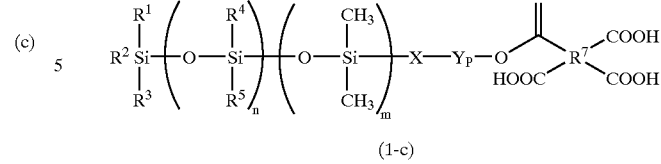
(1-c)
Reaction formula (f):
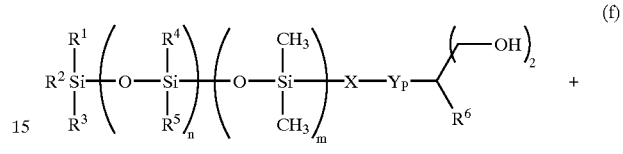
(5-b)
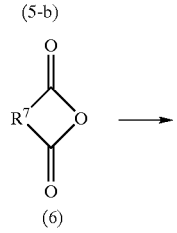
(6)
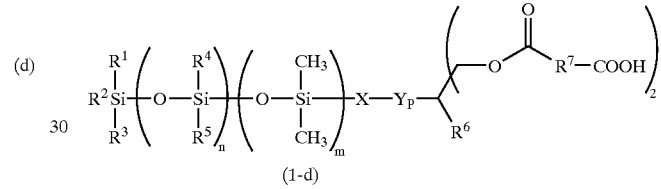
(1-d)
Reaction Formula (g):
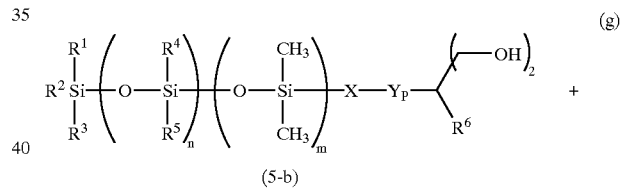
(5-b)
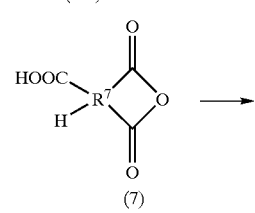
(7)
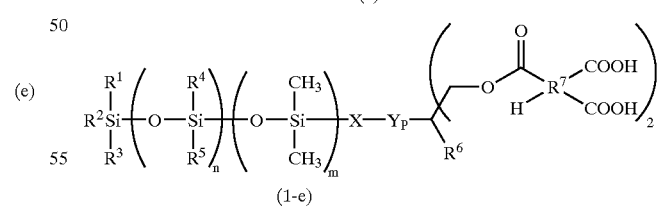
(1-e)
Reaction Formula (h):
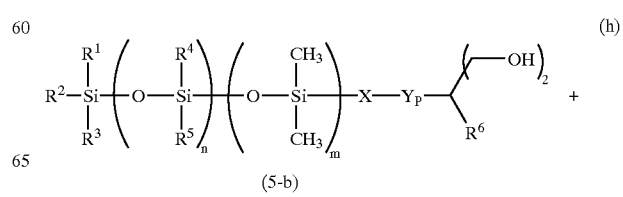
(5-b)

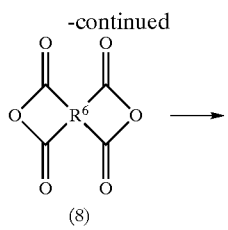

(8)

(1-f)

The first method of monoesterification is attained in a homogeneous system that contains a solvent. The solvent for the first method may be any and every one not interfering with the monoesterification and capable of dissolving both the silicone with hydroxy group at one terminal position of formula (5) and the acid anhydride of at least one selected from the group of the compounds of formulae (6), (7) and (8). For example, the solvent of that type includes hydrocarbons such as hexane, heptane, etc.; ketones such as acetone, methyl ethyl ketone, diethyl ketone, methyl isobutyl ketone, etc.; ethers such as diethyl ether, diisopropyl ether, dibutyl ether, tetrahydrofuran (THF), dioxane, etc.; polar organic solvents such as N,N-dimethylformamide, N,N-dimethylacetamide, etc.; halogenohydrocarbons such as dichloromethane, chloroform, carbon tetrachloride, etc.; aromatic hydrocarbons such as benzene, toluene, xylene, cumene, etc.; and also pyridine, etc. One or more of these solvents may be used either singly or as combined.

Preferably, the solvent for use herein does not contain impurities (e.g., water, alcohols, primary and secondary amines, carboxylic acids) which will react with the silicone with hydroxyl group at one terminal position of formula (5) or with the acid anhydride of at least one selected from the group of the compounds of formulae (6), (7) and (8). The amount of the solvent to be used is not specifically defined.

In general, since the viscosity of the silicone with hydroxyl group at one terminal position of formula (5) is high, the viscosity of the reaction system will be also high. Therefore, adding a solvent to such a reaction system is preferred, as lowering the viscosity of the reaction liquid. The temperature for the monoesterification is not also specifically defined, but is preferably not higher than the boiling point of the solvent used.

In order to retard the formation of by-products and to increase the yield of the modified carboxyl-terminated polyorganosiloxane (of formula (1-a), (1-b), (1-c), (1-d), (1-e) or (1-f)} in the first method, a tertiary amine is preferably added to the reaction system. The tertiary amine includes, for example, trimethylamine, triethylamine, tri-n-propylamine, triisopropylamine, tributylamine, tripentylamine, trihexylamine, 4-dimethylaminopyridine (DMAP), 1,8-diazabicyclo(5.4.0)undecene-7 (DBU), etc. Above all, trimethylamine or triethylamine is preferably used in the first method. In case where a solvent having a tertiary amine structure, such as N,N-dimethylformamide, pyridine or the like, is used in the method, any additional tertiary amine is unnecessary therein.

The amount of the tertiary amine to be used is not specifically defined. However, in view of the reactivity and the economical aspect, the amount of the tertiary amine to be used preferably falls between 0.01 and 5 molar times that of the silicone with hydroxyl group at one terminal position of formula (5), more preferably between 0.1 and 2 molar times.

In case where triethylamine is used as the tertiary amine in the method, it will react with the carboxyl group of the modified carboxyl-terminated polyorganosiloxane produced therein to form a salt. The problem can be solved by adding an organic acid such as acetic acid or an inorganic acid (mineral acid) such as hydrochloric acid to the reaction mixture to thereby liberate the modified silicone. In case where a mineral acid is used for that purpose, it will react on the siloxane segments to break their bonding. Therefore, it is desirable that the mineral acid to be used is diluted to a satisfactory degree.

In the first method, it is also desirable that an excessive amount of the acid anhydride {of any of formulae (6) (7) and (8)} is used in order to ensure complete consumption of the silicone with hydroxyl group at one terminal position of formula (5) therein. In that case, however, thenon-reacted acid anhydride will remain in the reaction mixture. To remove it, the remaining, non-reacted acid anhydride is hydrolyzed with water added to the reaction system, and the resulting carboxylic acid could be washed away along with methanol or the like added to the system. In addition, the non-reacted acid anhydride could also be washed away along with methanol or the like added to the system.

The second method of monoesterification is attained in the absence of a solvent. This requires a high temperature for the reaction, but does not require a tertiary amine. In the method, the monoesterification is preferably effected at a temperature falling between 50 and300° C., but more preferably between 150 and 250° C. in view of the reactivity and the economical aspect.

At high temperatures, the acid anhydride is generally liquid and, when blended with the silicone with hydroxy group at one terminal position of formula (5), it will form a two-phase system. Even in such a two-phase system, the two can be well reacted with each other by stirring them under heat.

Like in the first method, it is also desirable to use an excessive amount of the acid anhydride in order to ensure complete consumption of the silicone with hydroxyl group at one terminal position of formula (5) in the second method. The post-treatment of the reaction mixture in the second method may be the same as that in the first method. In case where the viscosity of the product produced in the second method is low, the non-reacted acid anhydride could be removed through filtration.

Specific examples of the dicarboxylic acid anhydride of formula (6) are mentioned below, which, however, are not limitative.

The dicarboxylic acid anhydride includes, for example, aromatic dicarboxylic acid anhydrides such as phthalic anhydride, 1,8-naphthalenedicarboxylic acid anhydride, etc.; aliphatic dicarboxylic acid anhydrides such as succinic anhydride, maleic anhydride, itaconic anhydride, citraconic anhydride, etc.

Some examples of the structural formulae of the dicarboxylic acid anhydride of formula (6) are mentioned below.

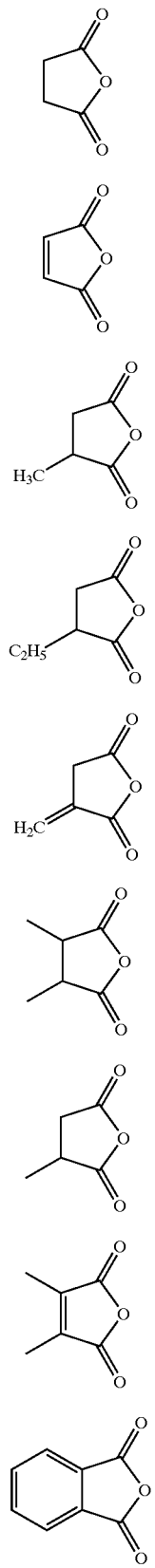

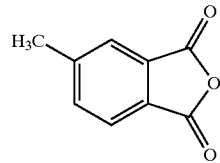

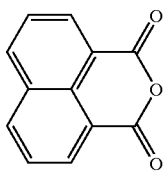

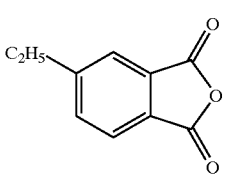

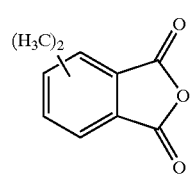

One example of the acid anhydride of formula (7) is mentioned below.

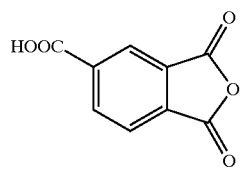

Specific examples of the tetracarboxylic acid dianhydride of formula (8) are mentioned below, which, however, are not limitative. Herein mentioned are known compounds for the tetracarboxylic acid dianhydride, including, for example, aromatic tetracarboxylic acid dianhydrides such as pyromellitic acid dianhydride, 3,3',4,4'-biphenyltetracarboxylic acid dianhydride, 2,2',3,3'-biphenyltetracarboxylic acid dianhydride, 2,3,3',4'-biphenyltetracarboxylic acid dianhydride, 3,3',4,4'-benzophenonetetracarboxylic acid dianhydride, 2,2',3,3'-benzophenonetetracarboxylic acid dianhydride, 2,3,3',4'-benzophenonetetracarboxylic acid dianhydride, bis(3,4-dicarboxyphenyl) ether dianhydride, bis(3,4-dicarboxyphenyl) sulfonedianhydride, 1,2,5,6-naphthalenetetracarboxylic acid dianhydride, 2,3,6,7-naphthalenetetracarboxylic acid dianhydride, 2,2-bis(3,4-dicarboxyphenyl)hexafluoropropane dianhydride, etc.; alicyclic tetracarboxylic acid dianhydrides such as cyclobutanetetracarboxylic acid dianhydride, methylcyclobutanetetracarboxylic acid dianhydride, etc.; and aliphatic tetracarboxylic acid dianhydrides such as 1,2,3,4-tetracarboxybutane dianhydride, etc.

Some examples of the structural formulae of the tetracarboxylic acid dianhydride of formula (8) are mentioned below.

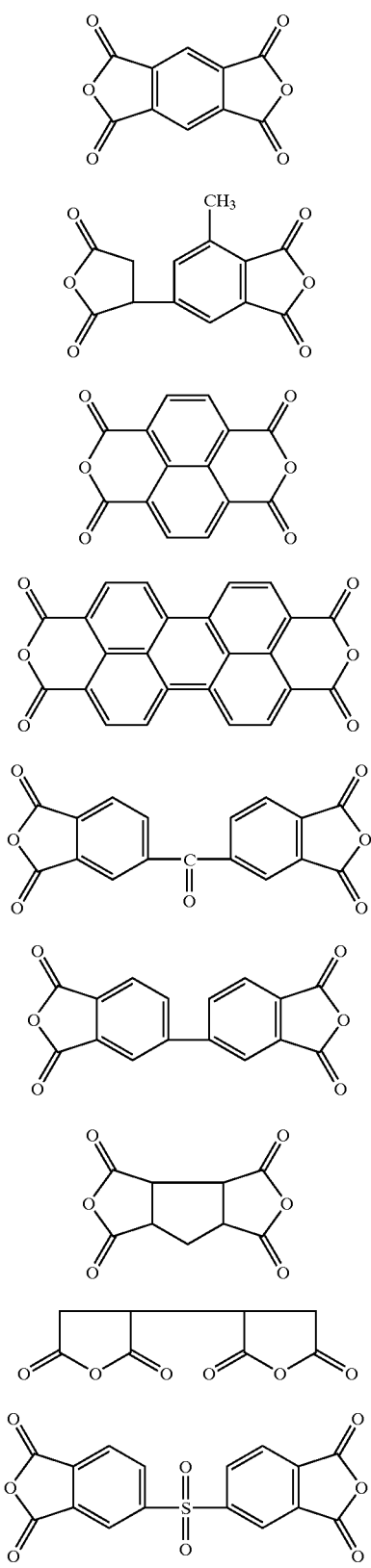

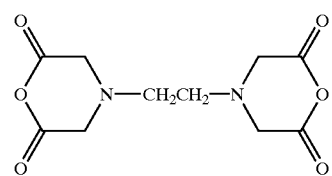

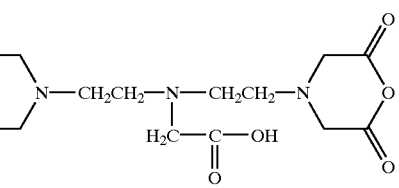

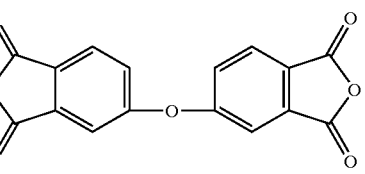

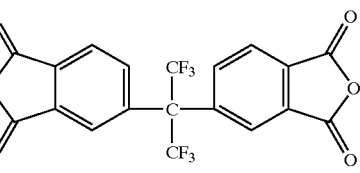

The novel modified carboxyl-terminated polyorganosiloxanes provided by the present invention are characterized in that the method for producing them does not require plural reaction steps, and that various types of the modified polyorganosiloxanes can be obtained with ease, depending on the dicarboxylic acid anhydrides used for their production.

For example, the modified carboxyl-terminated polyorganosiloxanes having at least two carboxyl groups at one terminal position can be polycondensed with polymers such as polyesters to thereby introduce the polysiloxane chain into the side chains of the polymers. With that, the thus-polycondensed polymers can have improved weather resistance, surface water repellency, surface smoothness and lubricity, not interfering with the physical properties intrinsic to the original polymers.

The modified carboxyl-terminated polyorganosiloxanes having polyoxyalkylene segments between the terminal carboxyl group and the polysiloxane segments are highly miscible with various polar solvents and monomers, and therefore have many applications in various fields.

EXAMPLES

The invention is described in more detail with reference to the following Examples, which, however, are not intended to restrict the scope of the invention. The physical properties of the compounds produced in the Examples are measured according to the methods mentioned below.

(1) Viscosity

This is measured according to JIS Z8803 (method of viscosity measurement), for which is used a Cannon-Fenske viscometer.

(2) Water Content

This is measured according to JIS K0068 (method for measuring the water content of chemical products).

(3) Specific Gravity

This is measured according to JIS K0061 (method for measuring the density and the specific gravity of chemical products).

(4) Acid Value

This is measured according to JIS K0070 (method for measuring the acid value, the saponification value, the ester value, the iodine value and the hydroxyl value of chemical products, and method for testing saponified products).

(5) IR Absorption Spectrum

This is obtained according to the Neat method using a JASCO Corporation's IR spectrometer.

(6) $^1$H-NMR (Nuclear Magnetic Resonance) Spectrum

For this, used is a JEOL's NMR spectrometer (90 MHz, CDCl$_3$, 400 cycles).

Succinic anhydride, trimellitic acid anhydride, triethylamine, acetone, methyl ethyl ketone, toluene and methanol used in the Examples are all chemical reagents produced by Kishida Chemical Co. Ltd. Pyromellitic acid anhydride also used therein is a chemical reagent produced by Tokyo Kasei Kogyo Co. Ltd.

Example 1

50 g of silicone with hydroxyl group at one terminal position having a molecular weight of 1000 (Chisso's FM-0411—this has a hydroxyl equivalent of 1108, and corresponds to formula (5-a) where $R^1$, $R^3$, $R^4$ and $R^5$ are methyl, $R^2$=—C$_4$H$_9$, n+m≈11, X=—CH$_2$CH$_2$CH$_2$— or —CH(CH$_3$)CH$_2$—, Y=—OCH$_2$CH$_2$—, and p=1), and 9.0 g of succinic anhydride were put into a 100-ml three-neck flask equipped with a magnetic stirrer and a thermometer.

The contents of the flask were heated at 200° C., and kept stirred for 8 hours at the temperature. Next, this was cooled to room temperature, and 50 g of methanol was added thereto to dissolve it. The solid was removed from it through filtration under reduced pressure, and a transparent yellow solution was obtained.

The solution was shaken along with 50 g of toluene and 100 g of water added thereto, whereby the excess succinic anhydride was hydrolyzed into succinic acid. With that, the acid was extracted out into the aqueous phase. This operation was repeated three times. Next, the solvent and the volatile component were evaporated away from the extraction residue under reduced pressure, for which was used an evaporator. Then, the residue was filtered, and 49 g of a transparent pale-yellow liquid was obtained.

Figure 2:
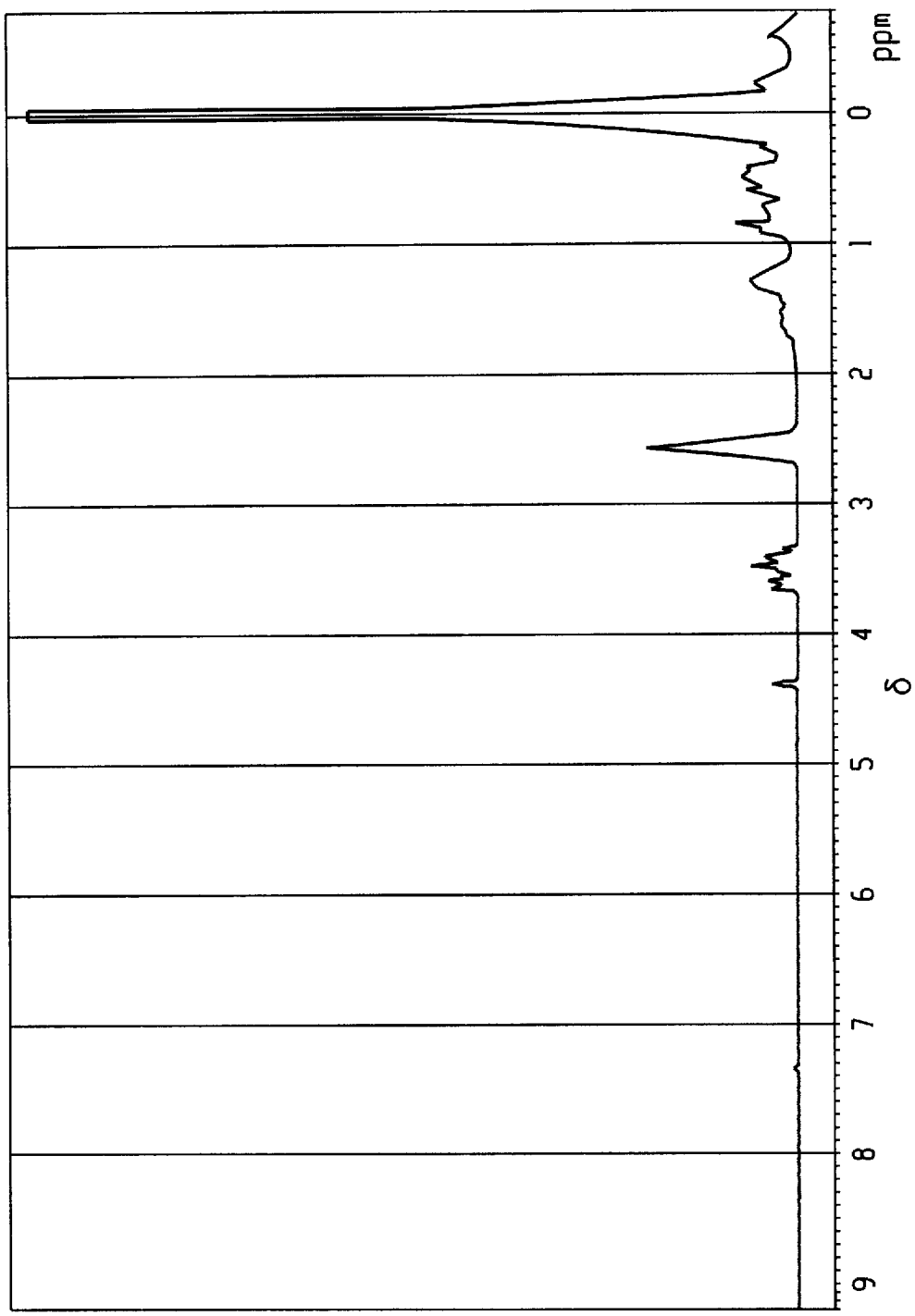
FIG. 2 is a $^1$H-NMR spectral chart of the modified polyorganosiloxane with carboxyl group at one terminal position in Example 1.

The transparent pale-yellow liquid had a viscosity of 42 mm$^2$/sec (25° C.), a water content of 480 ppm, an acid value of 36.3 (KOH mg/g), and a refractive index of 1.4150 (25° C.) Its IR spectral chart is in FIG. 1; and its $^1$H-NMR spectral chart is in FIG. 2. The pattern appearing at 1710 to 1760 cm$^{-1}$ in the IR spectral chart indicates the absorption by the carbonyl C=O in COOH and —COO— of the compound produced.

The data confirmed that the transparent pale-yellow liquid obtained herein is a modified carboxyl-terminated polydimethylsiloxane (of formula (1-a) where $R^7$ is —CH$_2$CH$_2$—) in which the hydroxyl group of silicon with hydroxyl group at one terminal position having a molecular weight of 1000 was modified with a carboxyl group.

Example 2

50 g of silicone with hydroxyl group at one terminal position having a molecular weight of 5000 (Chisso's FM-0421—this has a hydroxyl equivalent of 4861, and corresponds to formula (5-a) where $R^1$, $R^3$, $R^4$ and $R^5$ are methyl, $R^2$=—C$_4$H$_9$, n+m≈65, X=—CH$_2$CH$_2$CH$_2$— or —CH(CH$_3$)CH$_2$—, Y=—OCH$_2$CH$_2$—, and p=1), and 2.1 g of succinic anhydride were put into a 100-ml three-neck flask equipped with a magnetic stirrer and a thermometer.

The contents of the flask were heated at 200° C., and kept stirred for 8 hours at the temperature. Next, this was cooled to room temperature. Then, this was shaken along with 100 g of toluene and 150 g of water added thereto, whereby the excess succinic anhydride was hydrolyzed into succinic acid. With that, the acid was extracted out into the aqueous phase. This operation was repeated three times. Next, the solvent and the volatile component were evaporated away from the extraction residue under reduced pressure, for which was used an evaporator. Then, the residue was filtered, and 48 g of a transparent pale-yellow liquid was obtained.

Figure 3:
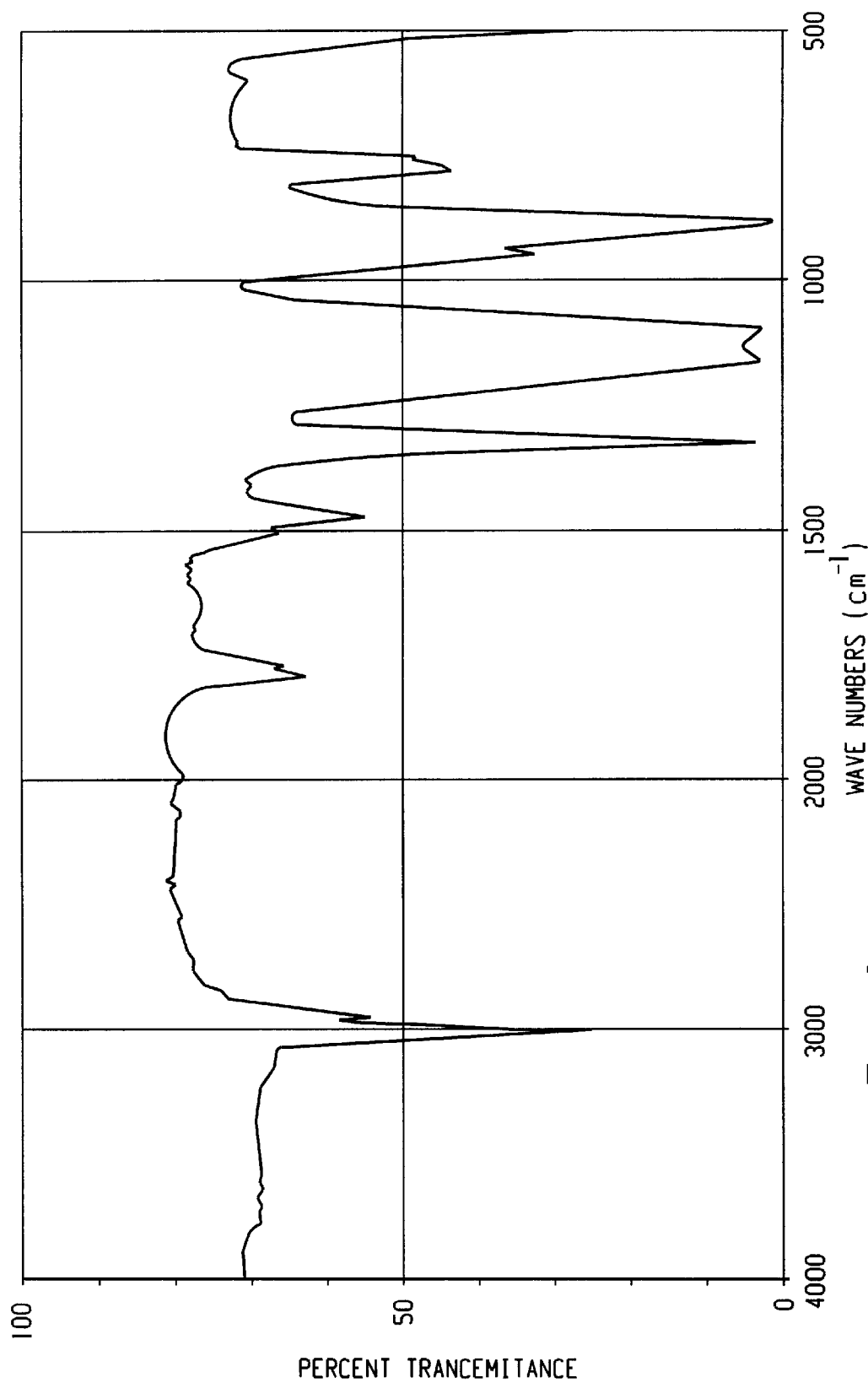
FIG. 3 is an IR spectral chart of the modified polyorganosiloxane with carboxyl group at one terminal position in Example 2.
Figure 4:
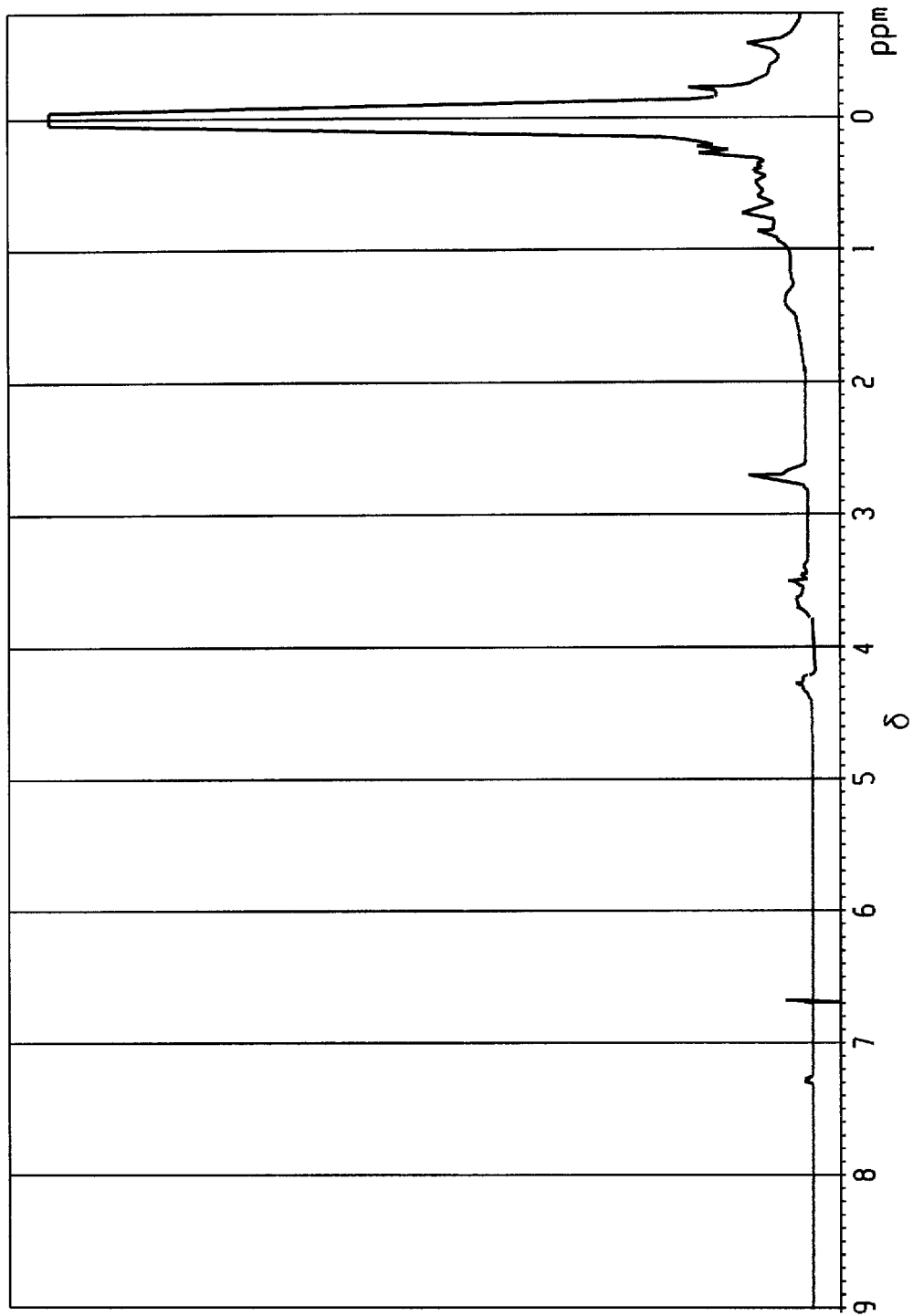
FIG. 4 is a $^1$H-NMR spectral chart of the modified polyorganosiloxane with carboxyl group at one terminal position in Example 2.

The transparent pale-yellow liquid had a viscosity of 120 mm$^2$/sec (25° C.), a water content of 310 ppm, an acid value of 7.7 (KOH mg/g), and a refractive index of 1.4065 (25° C.). Its IR spectral chart is in FIG. 3; and its $^1$H-NMR spectral chart is in FIG. 4. The pattern appearing at 1710 to 1760 cm$^{-1}$ in the IR spectral chart indicates the absorption by the carbonyl C=O in COOH and —COO— of the compound produced.

The data confirmed that the transparent pale-yellow liquid obtained herein is a modified carboxyl-terminated polydimethylsiloxane (of formula (1-a) where $R^7$ is —CH$_2$CH$_2$—) in which the hydroxyl group of silicone with hydroxyl group at one terminal position having a molecular weight of 5000 was modified with a carboxyl group.

Example 3

50 g of silicone with hydroxyl group at one terminal position having a molecular weight of 10000 (Chisso's FM-0425—this has a hydroxyl equivalent of 8912, and corresponds to formula (5-a) where $R^1$, $R^3$, $R^4$ and $R^5$ are methyl, $R^2$=—C$_4$H$_9$, n+m≈135, X=—CH$_2$CH$_2$CH$_2$— or —CH(CH$_3$)CH$_2$—, Y=—OCH$_2$CH$_2$—, and p=1), and 1.1 g of succinic anhydride were put into a 100-ml three-neck flask equipped with a magnetic stirrer and a thermometer.

The contents of the flask were heated at 200° C., and kept stirred for 8 hours at the temperature. Next, this was cooled to room temperature. Then, this was shaken along with 70 g of methanol added thereto, whereby the excess succinic anhydride was solvated into monomethyl succinate. With that, the ester was extracted out into the methanol phase. This operation was repeated three times. Next, the solvent and the volatile component were evaporated away from the extraction residue under reduced pressure, for which was used an evaporator. Then, the residue was filtered, and 48 g of a transparent pale-yellow liquid was obtained.

Figure 5:
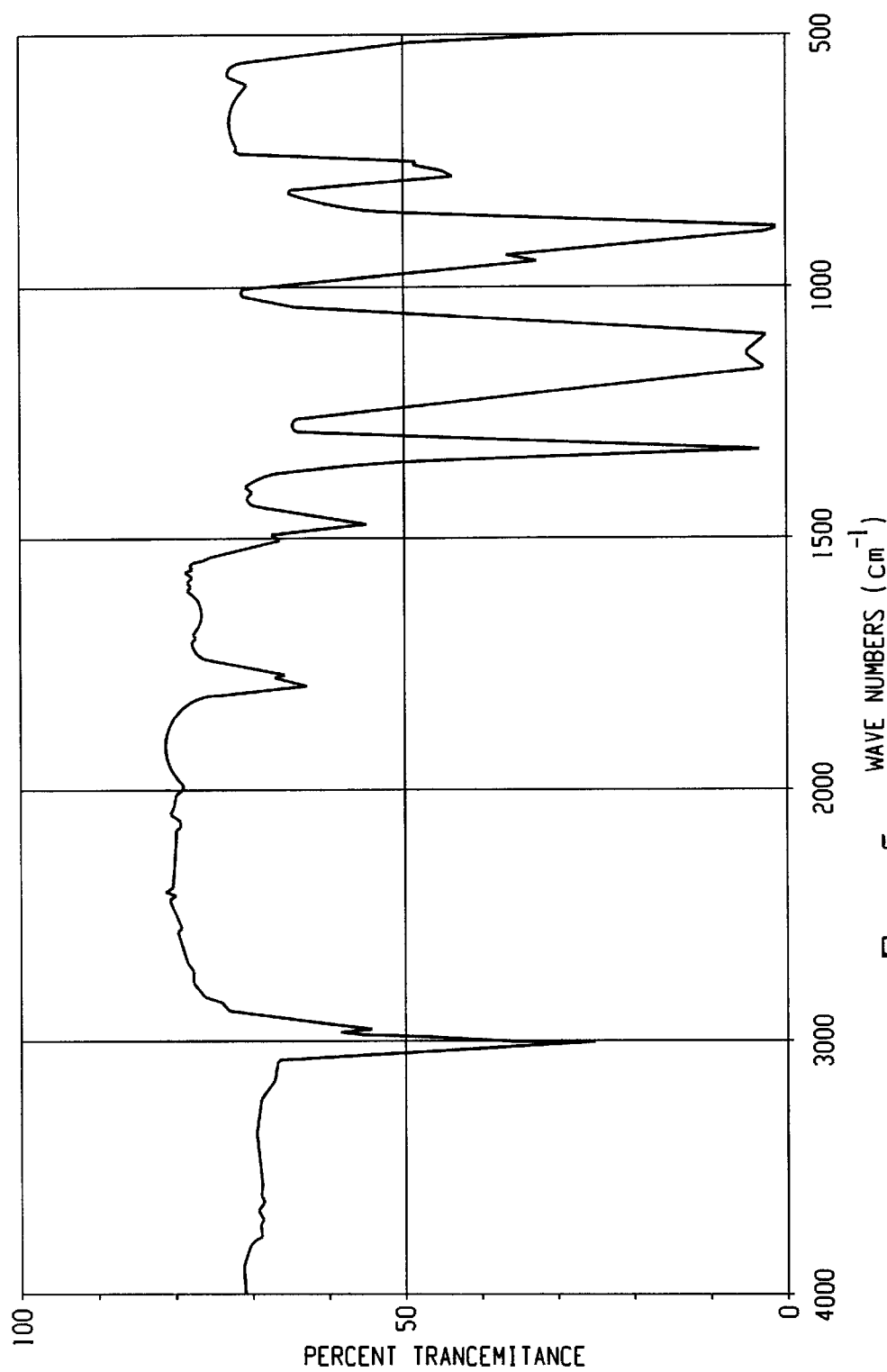
FIG. 5 is an IR spectral chart of the modified polyorganosiloxane with carboxyl group at one terminal position in Example 3.
Figure 6:
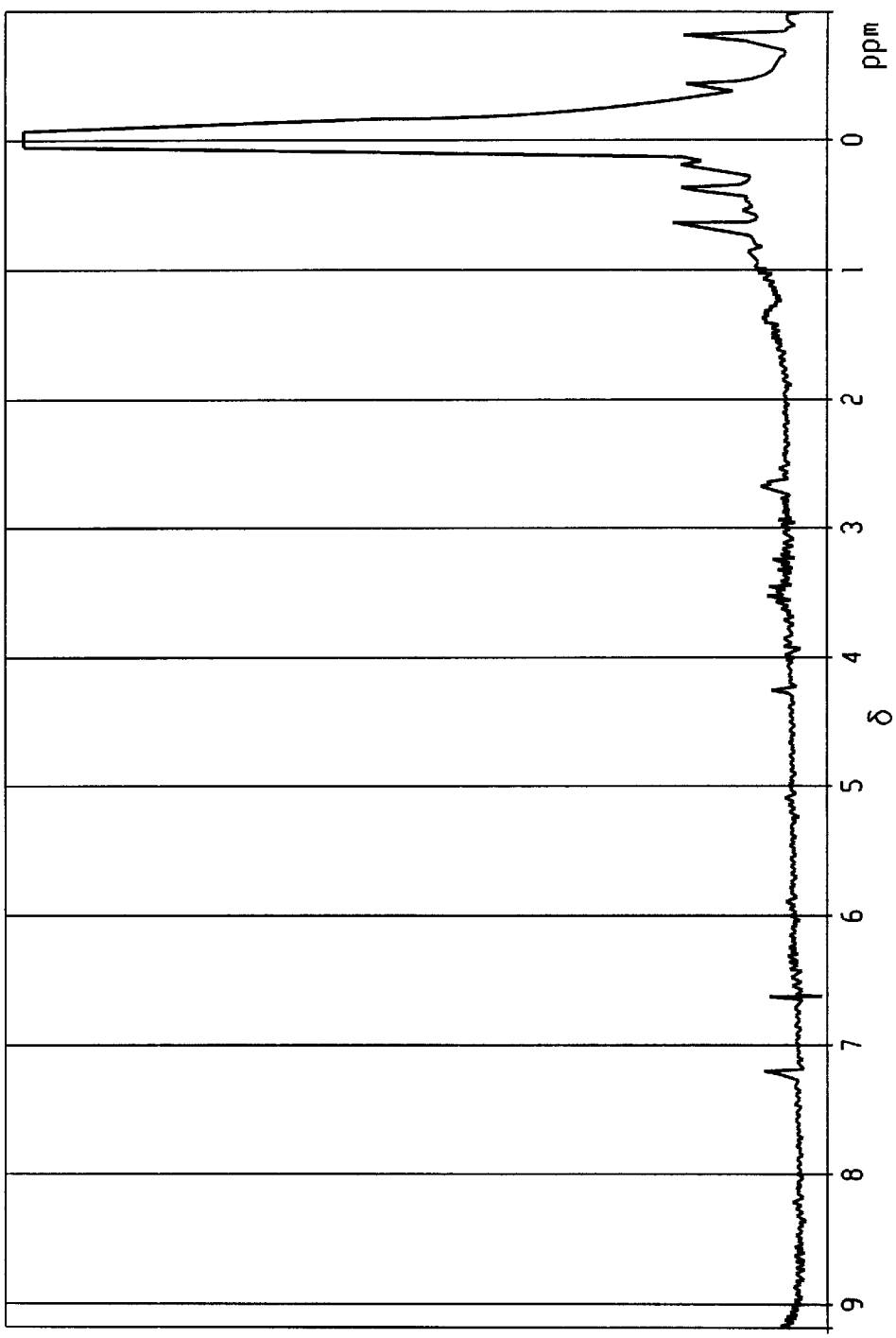
FIG. 6 is a $^1$H-NMR spectral chart of the modified polyorganosiloxane with carboxyl group at one terminal position in Example 3.

The transparent pale-yellow liquid had a viscosity of 380 mm$^2$/sec (25° C.), a water content of 100 ppm, an acid value of 2.6 (KOH mg/g), and a refractive index of 1.4052 (25° C.). Its IR spectral chart is in FIG. 5; and its $^1$H-NMR spectral chart is in FIG. 6. The pattern appearing at 1710 to 1760 cm$^{-1}$ in the IR spectral chart indicates the absorption by the carbonyl C=O in COOH and —COO— of the compound produced.

The data confirmed that the transparent pale-yellow liquid obtained herein is a modified carboxyl-terminated polydimethylsiloxane (of formula (1-a) where $R^7$ is —CH$_2$CH$_2$—) in which the hydroxyl group of the silicone with hydroxyl group at one terminal position having a molecular weight of 10000 was modified with a carboxyl group.

Example 4

(I) Preparation of Silicone with Hydroxyl Group at One Terminal Position 200 g of polydimethylsiloxane with SiH at one terminal position having a mean molecular weight of 5000, 12 g of polyoxyethylene with allyl group at one terminal position having a mean molecular weight of 200 {NOF Corporation's Uniox PKA-5001 (X'=—CH$_2$—CH=CH$_2$, Y=—OCH$_2$CH$_2$—, p=3 to 4)}, and 70 g of toluene were put into a 500-ml three-neck flask equipped with a magnetic stirrer, a condenser and a thermometer, and heated at 80° C. 40 µl of a platinum catalyst was added thereto, and the compounds were reacted for 5 hours at the elevated temperature of 80° C.

After 5 hours, the reaction mixture was cooled, to which was added 65 g of methanol. With that, the non-reacted polyoxyethylene was extracted out into the methanol phase. The extraction was repeated twice. Then, the solvent and the volatile component were evaporated away under reduced pressure from the toluene phase, for which was used an evaporator. Thus was obtained 203 g of a colorless transparent liquid.

The product had a hydroxyl equivalent of 3828. In its IR spectral chart, the SiH absorption (2210 cm$^{-1}$) intrinsic to the starting, SiH-having polydimethylsiloxane disappeared, but the OH absorption (3450 cm$^{-1}$) was seen. This indicates that the product obtained herein is a block copolymer, silicone with hydroxyl group at one terminal position composed of polydimethylsiloxane having a molecular weight of 5000 and polyoxyethylene having a molecular weight of 200.

(II) Production of a Modified Carboxyl-terminated Polyorganosiloxane 100 g of the silicone with hydroxyl group at one terminal position prepared in the previous step (I), 2.6 g of succinic anhydride, 1.0 g of toluene and 50 g of acetone were put into a 300-ml four-neck flask equipped with a magnetic stirrer and a thermometer.

The contents of the flask were heated at 57° C., and 1.7 ml of triethylamine was dropwise added thereto with stirring. Then, this was kept stirred at 57° C.

The reduction in the amount of succinic anhydride in the reaction system was traced by periodically sampling the reaction mixture and analyzing it through GC (gas chromatography), and it stopped after 5 hours. With that, heating and stirring the system was stopped.

This was cooled to room temperature, and 3.6 g of water and 1.2 g of acetic acid were added thereto in that order. This was again stirred, whereby the non-reacted succinic anhydride therein was converted into succinic acid and triethylamine was into its acetate. As a result, the reaction mixture became cloudy.

150 g of methanol was added to the reaction mixture, and the side products and the non-reacted compounds were extracted out into the methanol phase. The extraction was repeated twice. Next, the solvent and the volatile component were evaporated away from the extraction residue under reduced pressure, for which was used an evaporator. Then, the residue was filtered, and 73 g of a transparent pale-yellow liquid was obtained.

The transparent pale-yellow liquid had a viscosity of 300 mm$^2$/sec (25° C.), a water content of 520 ppm, a specific gravity of 0.981 (d$^{25}_4$), an acid value of 13.0 (KOH mg/g), and a refractive index of 1.4092 (25° C.)

Figure 7:
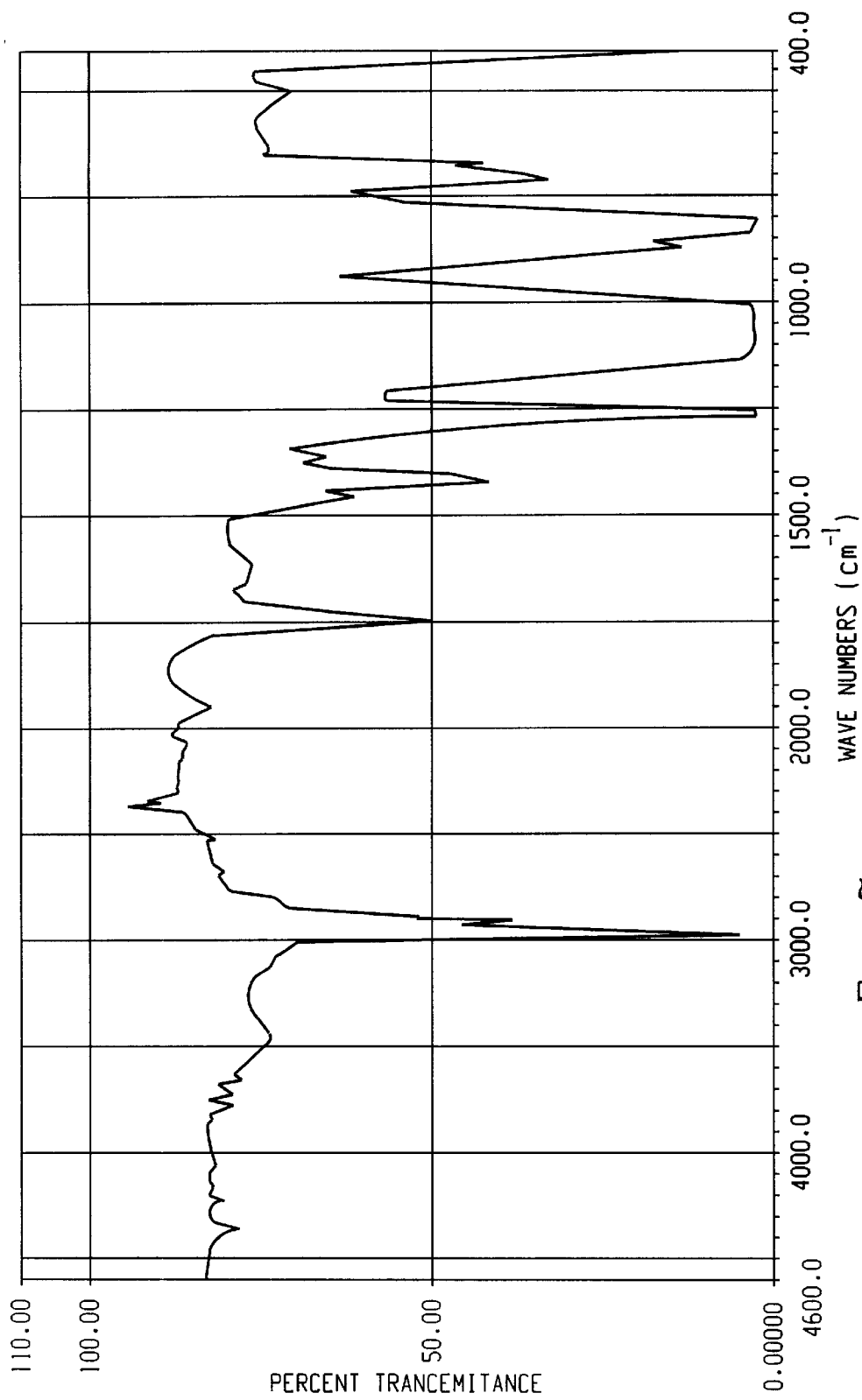
FIG. 7 is an IR spectral chart of the modified polyorganosiloxane with carboxyl group at one terminal position in Example 4.
Figure 8:
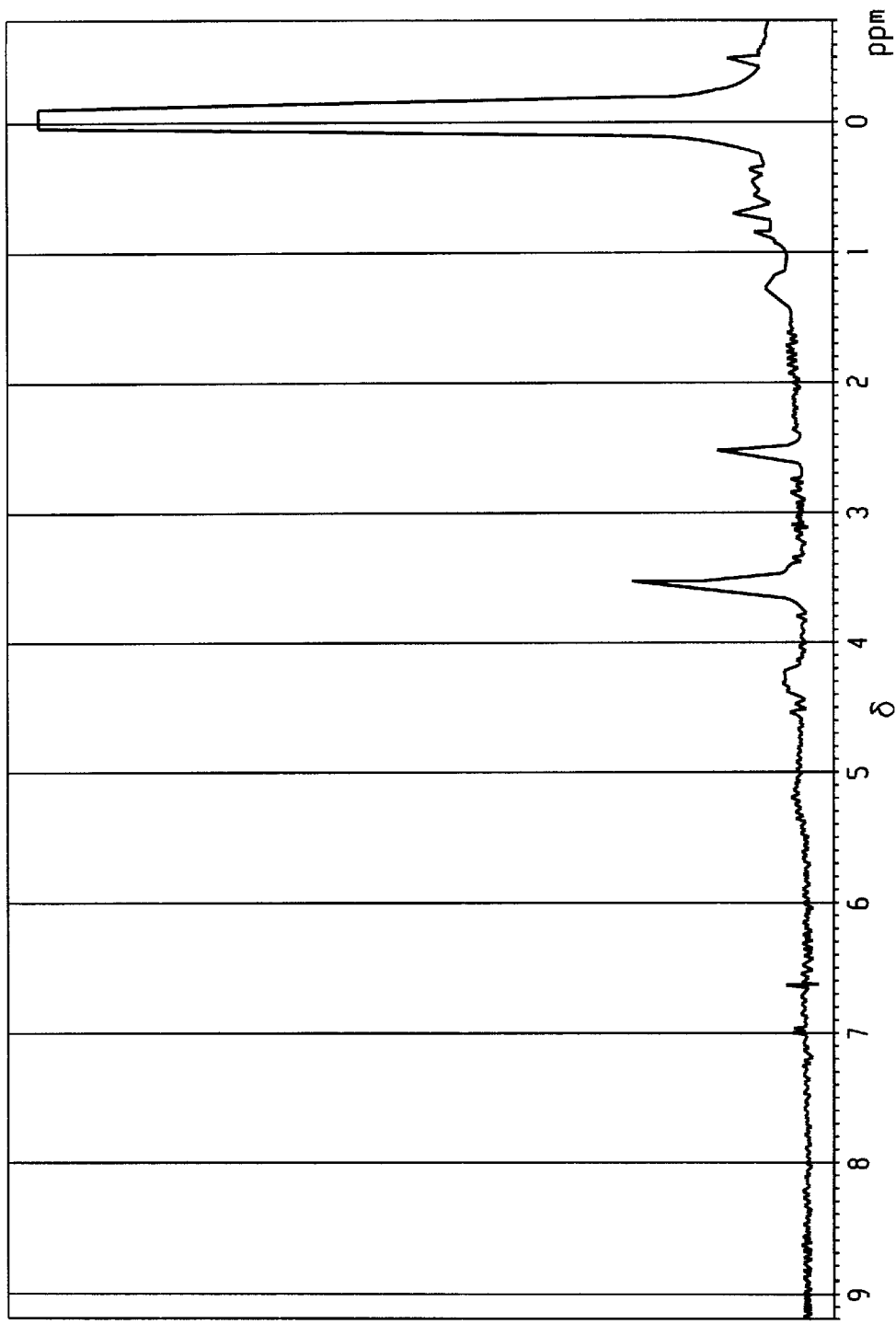
FIG. 8 is a $^1$H-NMR spectral chart of the modified polyorganosiloxane with carboxyl group at one terminal position in Example 4.

Its IR spectral chart is in FIG. 7; and its $^1$H-NMR spectral chart is in FIG. 8. The pattern appearing at 1710 to 1760 cm$^{-1}$ in the IR spectral chart indicates the absorption by the carbonyl C=O in COOH and —COO— of the compound produced.

The data confirmed that the transparent pale-yellow liquid obtained herein is a modified carboxyl-terminated polydimethylsiloxane (of formula (1-a) where R$^1$, R$^3$, R$^4$ and R$^5$ are methyl, R$^2$ is butyl, R$^7$ is —CH$_2$CH$_2$—, n+m≈65, X is —CH$_2$CH$_2$CH$_2$— or —CH(CH$_3$)CH$_2$—, Y is —OCH$_2$CH$_2$—, and p is 3 to 4) in which the hydroxyl group of the silicone with hydroxyl group at one terminal position composed of polydimethylsiloxane having a molecular weight of 5000 and polyoxyethylene having a molecular weight of 200 was modified with a carboxyl group.

Example 5

(I) Preparation of Silicone with Hydroxyl Group at One Terminal Position 200 g of polydimethylsiloxane with SiH at one terminal position having a mean molecular weight of 10000, 6 g of polyoxyethylene with allyl group at one terminal position having a mean molecular weight of 200 {NOF Corporation's Uniox PKA-5001 (X'=—CH$_2$—CH=CH$_2$, Y=—OCH$_2$CH$_2$—, p=3 to 4)}, and 70 g of toluene were put into a 500-ml three-neck flask equipped with a magnetic stirrer, a condenser and a thermometer, and heated at 80° C. 40 µl of a platinum catalyst was added thereto, and the compounds were reacted for 5 hours at the elevated temperature of 80° C.

After 5 hours, the reaction mixture was cooled, to which was added 65 g of methanol. With that, the non-reacted polyoxyethylene was extracted out into the methanol phase. The extraction was repeated three times. Then, the solvent and the volatile component were evaporated away under reduced pressure from the toluene phase, for which was used an evaporator. Thus was obtained 188 g of a colorless transparent liquid.

The product had a hydroxyl equivalent of 9724. In its IR spectral chart, the SiH absorption (2210 cm$^{-1}$) intrinsic to the starting, SiH-having polydimethylsiloxane disappeared, but the OH absorption (3450 cm$^{-1}$) was seen. This indicates that the product obtained herein is a block copolymer, silicone with hydroxyl group at one terminal position composed of polydimethylsiloxane having a molecular weight of 10000 and polyoxyethylene having a molecular weight of 200.

(II) Production of a Modified Carboxyl-terminated Polyorganosiloxane 106 g of the silicone with hydroxyl group at one terminal position prepared in the previous step (I), 1.2 g of succinic anhydride, 1.0 g of toluene and 50 g of methyl ethyl ketone were put into a 300-ml four-neck flask equipped with a magnetic stirrer and a thermometer.

The contents of the flask were heated at 62° C., and 760 µl of triethylamine was dropwise added thereto with stirring. Then, this was kept stirred at 62° C.

The reduction in the amount of succinic anhydride in the reaction system was traced by periodically sampling the reaction mixture and analyzing it through GC, and it stopped after 5 hours. With that, heating and stirring the system was stopped.

This was cooled to room temperature, and 2.1 g of water and 0.7 g of acetic acid were added thereto in that order. This was again stirred, whereby the non-reacted succinic anhydride therein was converted into succinic acid and triethylamine was into its acetate. As a result, the reaction mixture became milky.

150 g of methanol and 50 g of toluene were added to the reaction mixture, and the side products and the non-reacted compounds were extracted out into the solvent phase. The extraction was repeated twice. Next, the solvent and the volatile component were evaporated away from the extraction residue, toluene phase under reduced pressure, for which was used an evaporator. Then, the residue was filtered, and 103 g of a transparent pale-yellow liquid was obtained.

The transparent pale-yellow liquid had a viscosity of 460 mm²/sec (25° C.), a water content of 330 ppm, a specific gravity of 0.978 ($d^{25}_4$), an acid value of 5.7 (KOH mg/g), and a refractive index of 1.4062 (25° C.)

Figure 9:
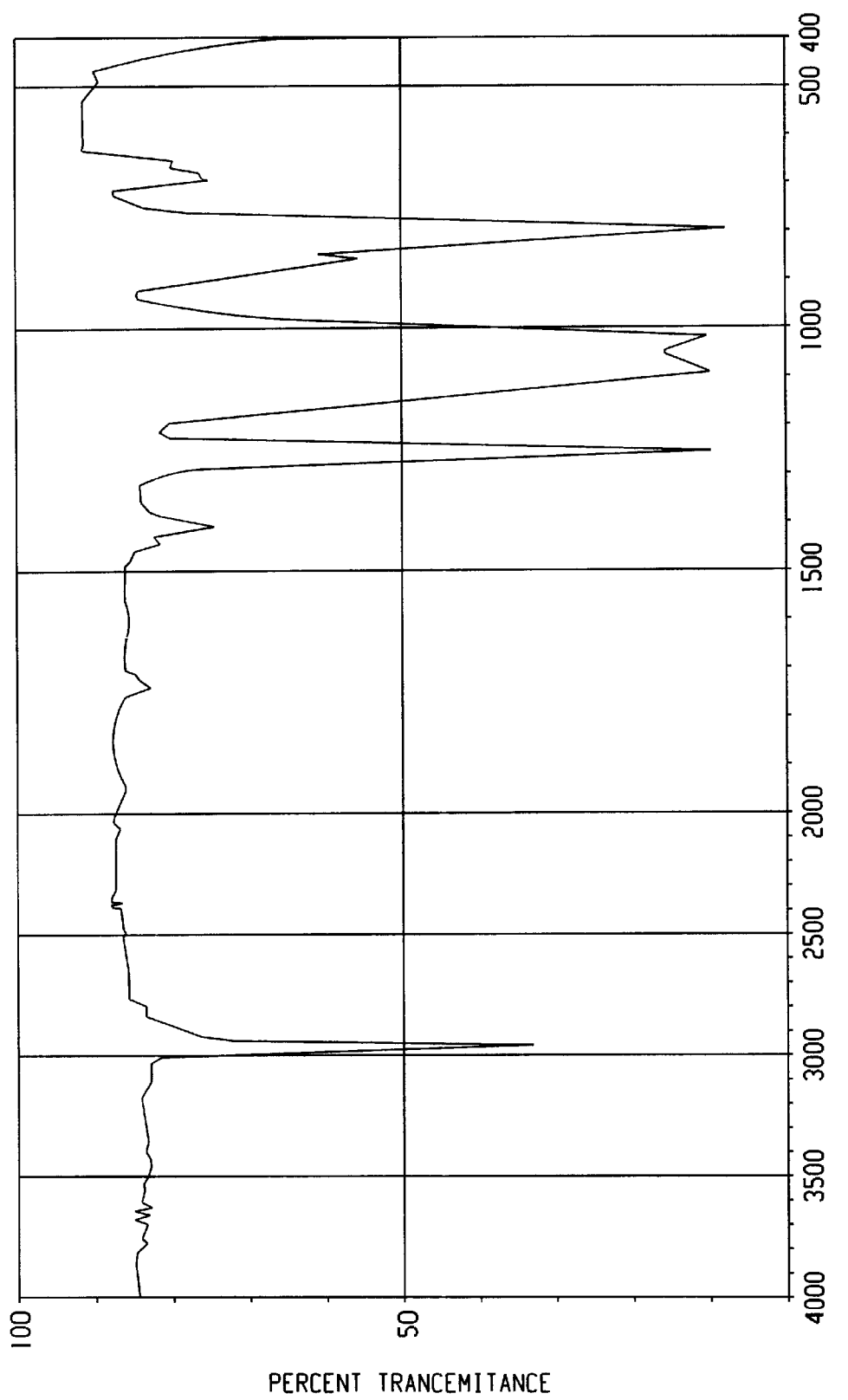
FIG. 9 is an IR spectral chart of the modified polyorganosiloxane with carboxyl group at one terminal position in Example 5.
Figure 10:
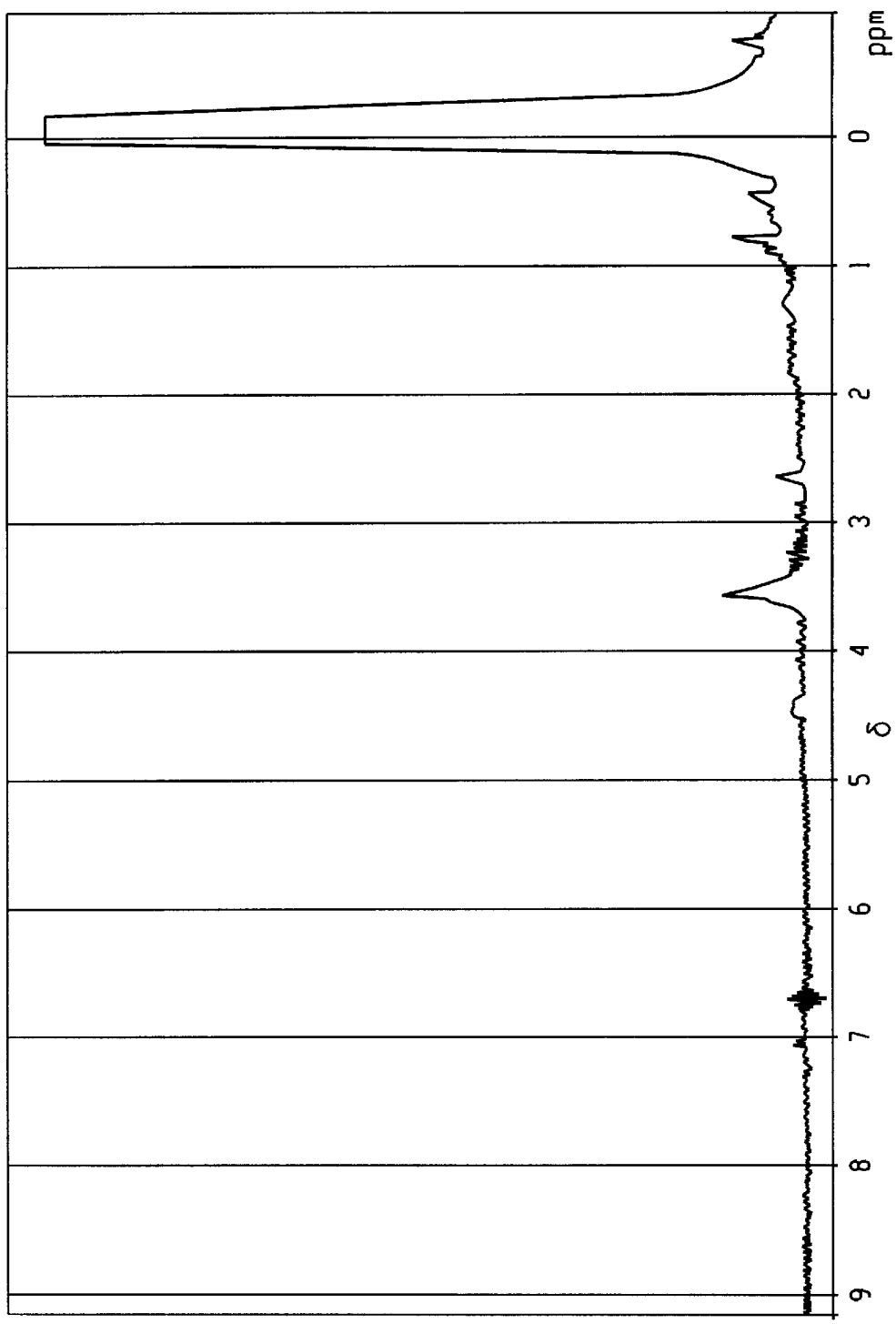
FIG. 10 is a $^1$H-NMR spectral chart of the modified polyorganosiloxane with carboxyl group at one terminal position in Example 5.

Its IR spectral chart is in FIG. 9; and its $^1$H-NMR spectral chart is in FIG. 10. The pattern appearing at 1710 to 1760 cm$^{-1}$ in the IR spectral chart indicates the absorption by the carbonyl C=O in COOH and —COO— of the compound produced.

The data confirmed that the transparent pale-yellow liquid obtained herein is a modified carboxyl-terminated polydimethylsiloxane (of formula (1-a) where $R^1$, $R^3$, $R^4$ and $R^5$ are methyl, $R^2$ is butyl, $R^7$ is —CH$_2$CH$_2$—, n+m≈135, X is —CH$_2$CH$_2$CH$_2$— or —CH(CH$_3$)CH$_2$—, Y is —OCH$_2$CH$_2$—, and p is 3 to 4) in which the hydroxyl group of the silicone with hydroxyl group at one terminal position composed of polydimethylsiloxane having a molecular weight of 10000 and polyoxyethylene having a molecular weight of 200 was modified with a carboxyl group.

Example 6

(I) Preparation of Silicone with Hydroxyl Group at One Terminal Position 100 g of polydimethylsiloxane with SiH at one terminal position having a mean molecular weight of 5000, 13 g of polyoxyethylene with allyl group at one terminal position having a mean molecular weight of 400 {NOF Corporation's Uniox PKA-5002 (X'=—CH$_2$—CH=CH$_2$, Y=—OCH$_2$CH$_2$—, p 7 to 8)}, and 170 g of toluene were put into a 500-ml three-neck flask equipped with a magnetic stirrer, a condenser and a thermometer, and heated at 80° C. 11 μl of a platinum catalyst was added thereto, and the compounds were reacted for 4 hours at the elevated temperature of 80° C.

After 4 hours, the reaction mixture was cooled, to which was added 210 g of methanol. With that, the non-reacted polyoxyethylene was extracted out into the methanol phase. The extraction was repeated twice. Then, the solvent and the volatile component were evaporated away under reduced pressure from the toluene phase, for which was used an evaporator. Thus was obtained 87 g of a transparent pale-yellow liquid.

The product had a hydroxyl equivalent of 4465. In its IR spectral chart, the SiH absorption (2210 cm$^{-1}$) intrinsic to the starting, SiH-having polydimethylsiloxane disappeared, but the OH absorption (3450 cm$^{-1}$) was seen. This indicates that the product obtained herein is a block copolymer, silicone with hydroxyl group at one terminal position composed of polydimethylsiloxane having a molecular weight of 5000 and polyoxyethylene having a molecular weight of 400.

(II) Production of a Modified Carboxyl-terminated Polyorganosiloxane 100 g of the silicone with hydroxyl group at one terminal position prepared in the previous step (I), 2.4 g of succinic anhydride, 1.0 g of toluene and 50 g of acetone were put into a 300-ml four-neck flask equipped with a magnetic stirrer and a thermometer.

The contents of the flask were heated at 57° C., and 1.6 ml of triethylamine was dropwise added thereto with stirring. Then, this was kept stirred at 57° C.

The reduction in the amount of succinic anhydride in the reaction system was traced by periodically sampling the reaction mixture and analyzing it through GC, and it stopped after 5 hours. With that, heating and stirring the system was stopped.

This was cooled to room temperature, and 4.2 g of water and 1.4 g of acetic acid were added thereto in that order. This was again stirred, whereby the non-reacted succinic anhydride therein was converted into succinic acid and triethylamine was into its acetate. As a result, the reaction mixture became pale yellow.

200 g of methanol was added to the reaction mixture, and the side products and the non-reacted compounds were extracted out into the methanol phase. The extraction was repeated three times. Next, the solvent and the volatile component were evaporated away from the extraction residue under reduced pressure, for which was used an evaporator. Then, the residue was filtered, and 99 g of an yellow caramel substance was obtained.

The yellow caramel substance had a water content of 440 ppm, an acid value of 11.4 (KOH mg/g), and a refractive index of 1.4110 (25° C.)

Figure 11:
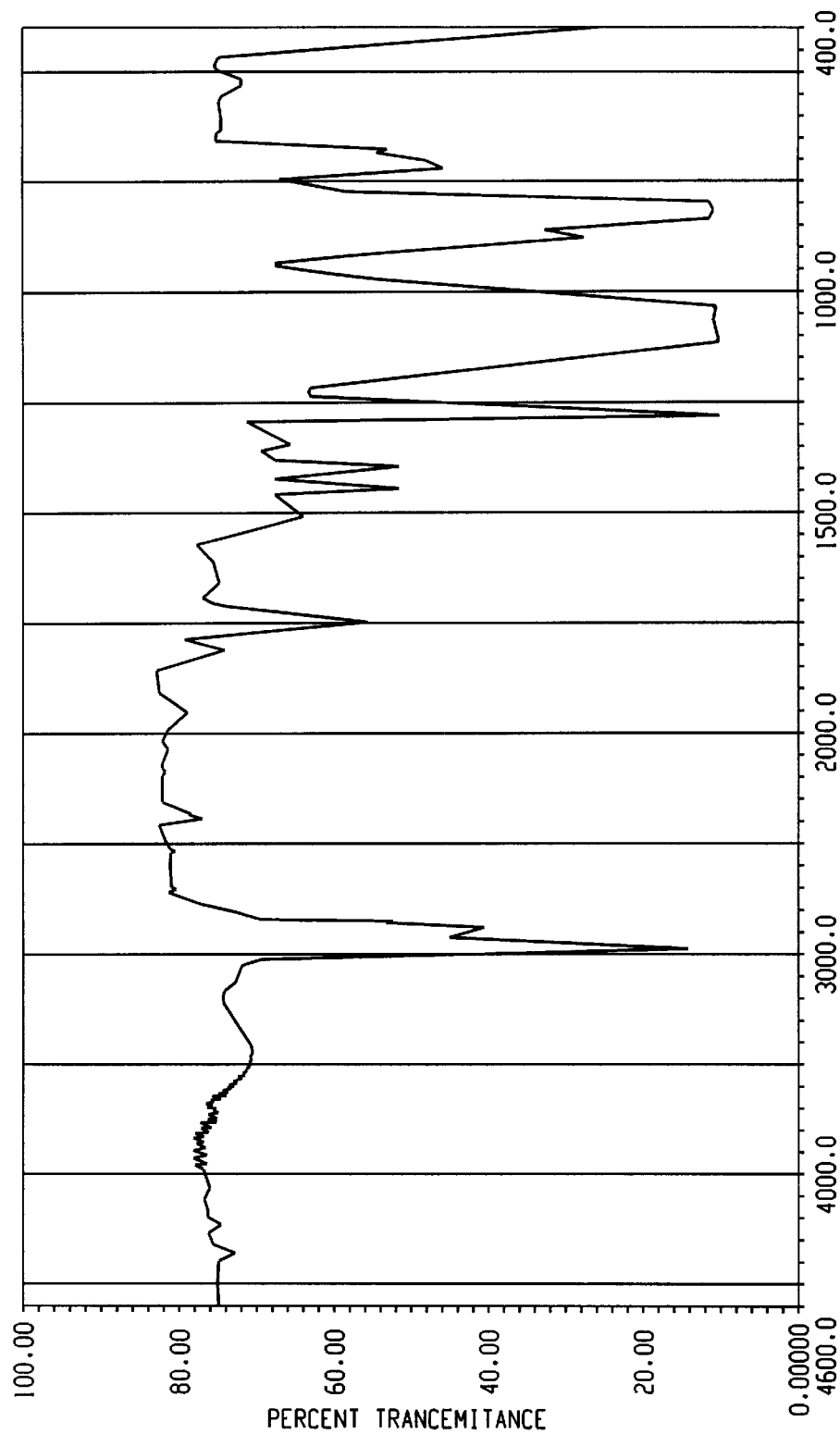
FIG. 11 is an IR spectral chart of the modified polyorganosiloxane with carboxyl group at one terminal position in Example 6.
Figure 12:
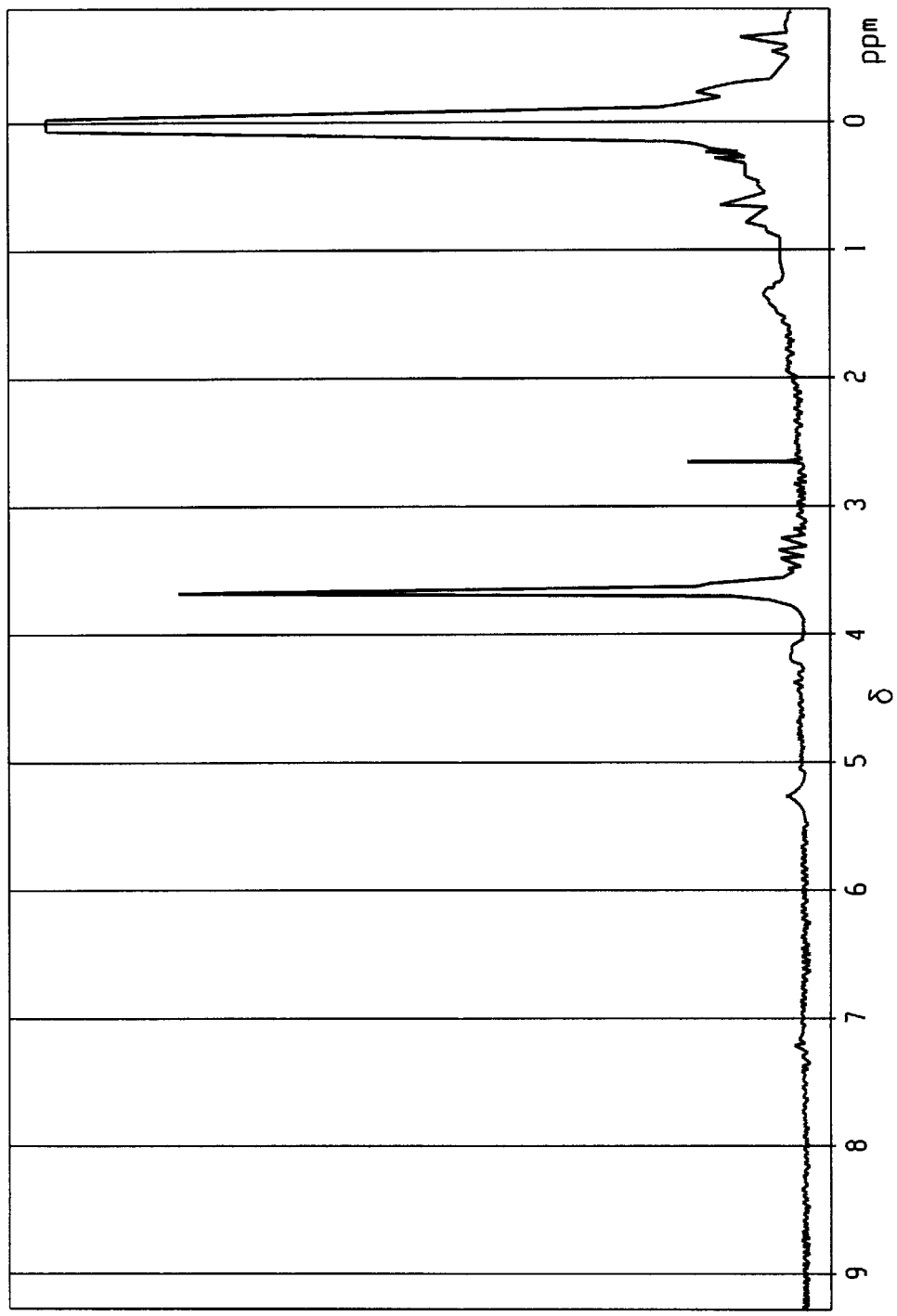
FIG. 12 is a $^1$H-NMR spectral chart of the modified polyorganosiloxane with carboxyl group at one terminal position in Example 6.

Its IR spectral chart is in FIG. 11; and its $^1$H-NMR spectral chart is in FIG. 12. The pattern appearing at 1710 to 1760 cm$^{-1}$ in the IR spectral chart indicates the absorption by the carbonyl C=O in COOH and —COO— of the compound produced.

The data confirmed that the yellow caramel substance obtained herein is a modified carboxyl-terminated polydimethylsiloxane (of formula (1-a) where $R^1$, $R^3$, $R^4$ and $R^5$ are methyl, $R^2$ is butyl, $R^7$ is —CH$_2$CH$_2$—, n+m≈65, X is —CH$_2$CH$_2$CH$_2$— or —CH(CH$_3$)CH$_2$—, Y is —OCH$_2$CH$_2$—, and p is 7 to 8) in which the hydroxyl group of the silicone with hydroxyl group at one terminal position composed of polydimethylsiloxane having a molecular weight of 5000 and polyoxyethylene having a molecular weight of 400 was modified with a carboxyl group.

Example 7

(I) Preparation of Silicone with Hydroxyl Group at One Terminal Position 100 g of polydimethylsiloxane with SiH at one terminal position having a mean molecular weight of 10000, 6 g of polyoxyethylene with allyl group at one terminal position having a mean molecular weight of 400 {NOF Corporation's Uniox PKA-5002 (X'=—CH$_2$—CH=CH$_2$, Y=—OCH$_2$CH$_2$—, p=7 to 8)}, and 160 g of toluene were put into a 500-ml three-neck flask equipped with a magnetic stirrer, a condenser and a thermometer, and heated at 80° C. 65 μl of a platinum catalyst was added thereto, and the compounds were reacted for 20 hours at the elevated temperature of 80° C.

After 20 hours, the reaction mixture was cooled, to which was added 140 g of methanol. With that, the non-reacted polyoxyethylene was extracted out into the methanol phase. The extraction was repeated twice. Then, the solvent and the volatile component were evaporated away under reduced pressure from the toluene phase, for which was used an evaporator. Thus was obtained 98 g of a transparent brown liquid.

The product had a hydroxyl equivalent of 11156. In its IR spectral chart, the SiH absorption (2210 cm$^{-1}$) intrinsic to the starting, SiH-having polydimethylsiloxane disappeared, but the OH absorption (3450 cm$^{-1}$) was seen. This indicates that the product obtained herein is a block copolymer, silicone with hydroxyl group at one terminal position composed of polydimethylsiloxane having a molecular weight of 10000 and polyoxyethylene having a molecular weight of 400.

(II) Production of a Modified Carboxyl-terminated Polyorganosiloxane 100 g of the silicone with hydroxyl group at one terminal position prepared in the previous step (I), 0.94 g of succinic anhydride, 1.0 g of toluene and 50 g of acetone were put into a 300-ml four-neck flask equipped with a magnetic stirrer and a thermometer.

The contents of the flask were heated at 57° C., and 630 μl of triethylamine was dropwise added thereto with stirring. Then, this was kept stirred at 57° C.

The reduction in the amount of succinic anhydride in the reaction system was traced by periodically sampling the reaction mixture and analyzing it through GC, and it stopped after 7 hours. With that, heating and stirring the system was stopped.

This was cooled to room temperature, and 1.7 g of water and 0.6 g of acetic acid were added thereto in that order. This was again stirred, whereby the non-reacted succinic anhydride therein was converted into succinic acid and triethylamine was into its acetate. As a result, the reaction mixture became milky.

150 g of methanol and 50 g of toluene were added to the reaction mixture, and the side products and the non-reacted compounds were extracted out into the solvent phase. The extraction was repeated twice. Next, the solvent and the volatile component were evaporated away from the extraction residue, toluene phase under reduced pressure, for which was used an evaporator. Then, the residue was filtered, and 97 g of a transparent pale-yellow liquid was obtained.

The transparent pale-yellow liquid had a water content of 530 ppm, a specific gravity of 0.979 ($d^{25}_4$), an acid value of 3.9 (KOH mg/g), and a refractive index of 1.4064 (25° C.).

Figure 13:
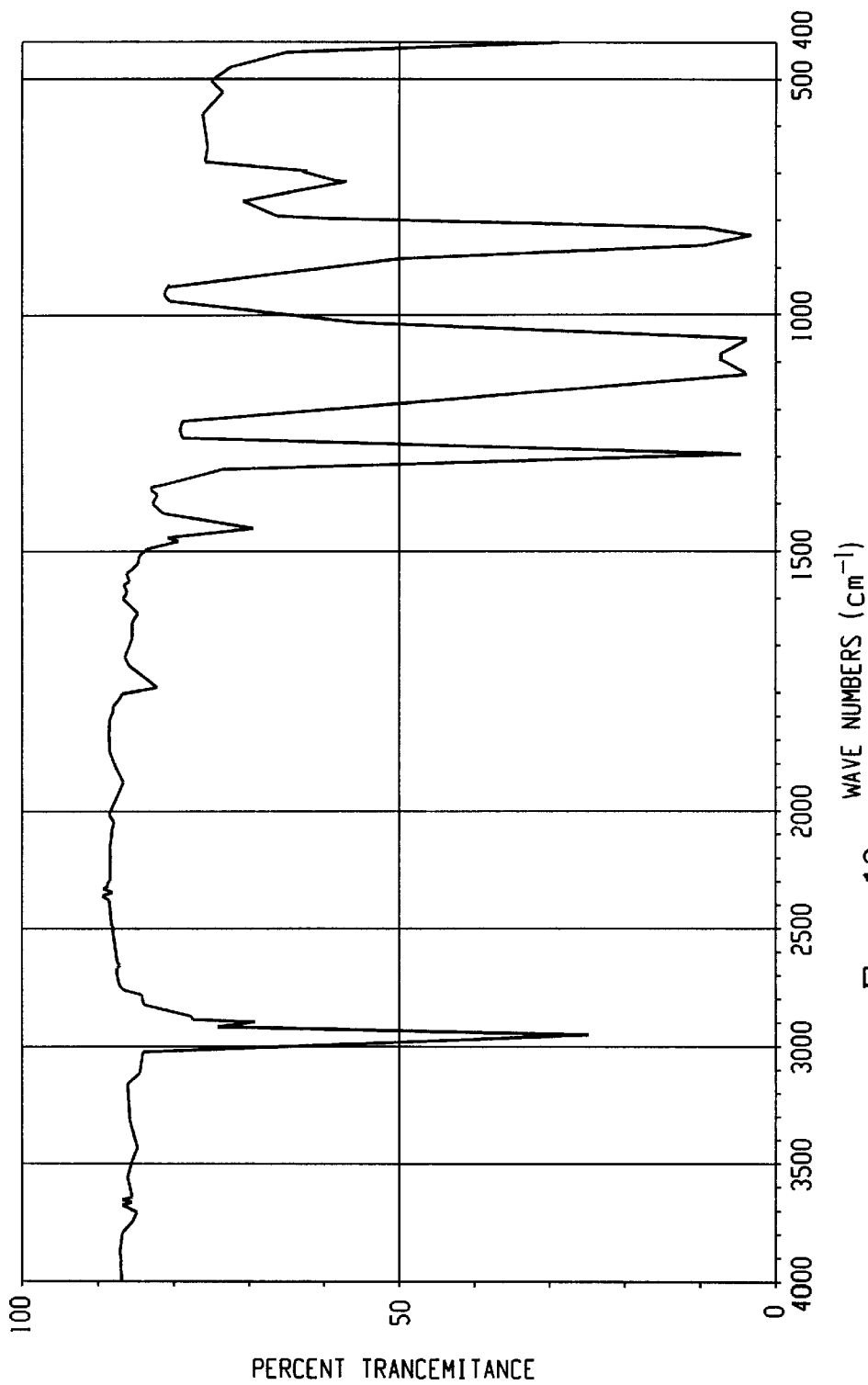
FIG. 13 is an IR spectral chart of the modified polyorganosiloxane with carboxyl group at one terminal position in Example 7.
Figure 14:
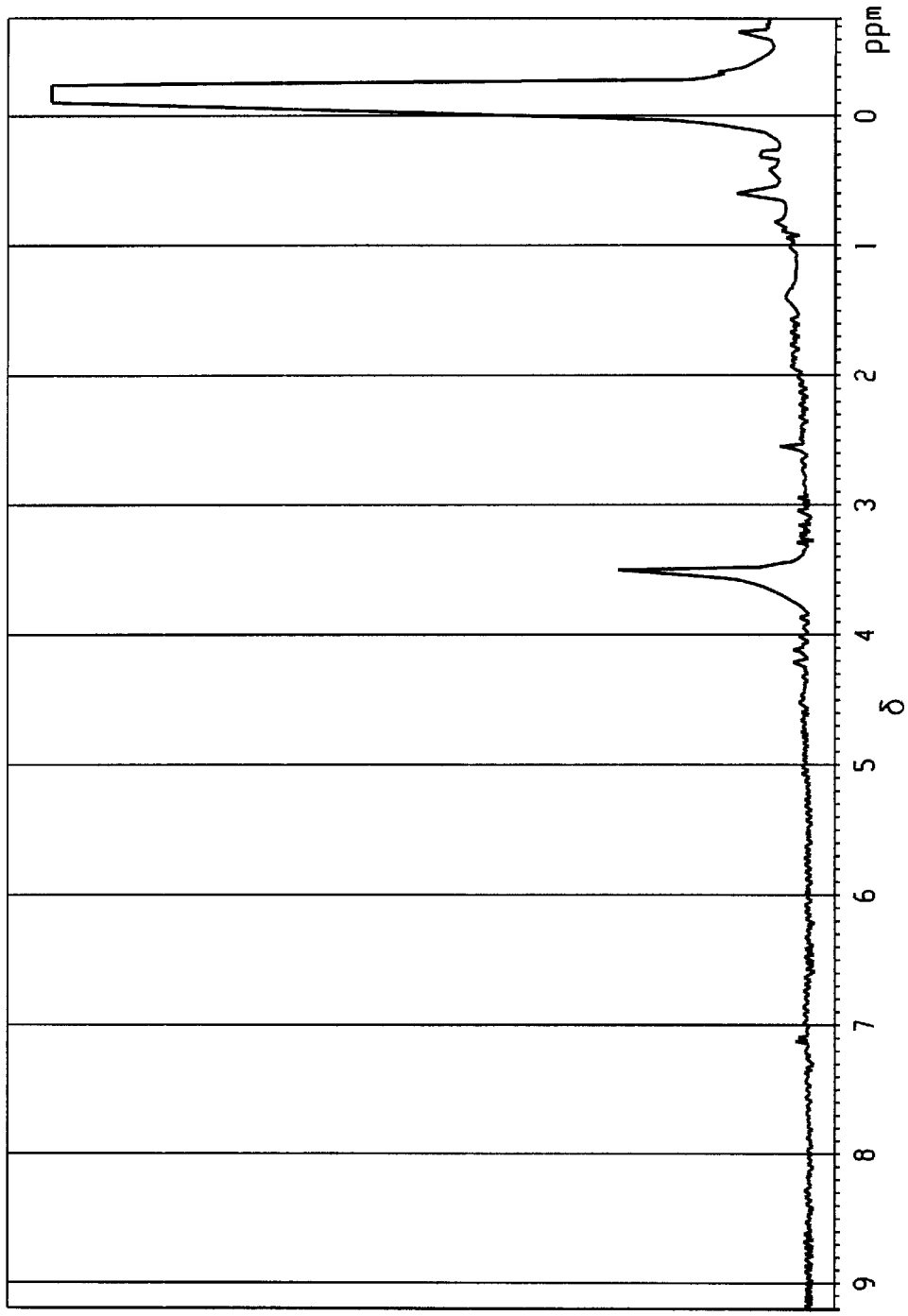
FIG. 14 is a $^1$H-NMR spectral chart of the modified polyorganosiloxane with carboxyl group at one terminal position in Example 7.

Its IR spectral chart is in FIG. 13; and its $^1$H-NMR spectral chart is in FIG. 14. The pattern appearing at 1710 to 1760 cm$^{-1}$ in the IR spectral chart indicates the absorption by the carbonyl C=O in COOH and —COO— of the compound produced.

The data confirmed that the transparent pale-yellow liquid obtained herein is a modified carboxyl-terminated polydimethylsiloxane (of formula (1-a) where $R^1$, $R^3$, $R^4$ and $R^5$ are methyl, $R^2$ is butyl, $R^7$ is —CH$_2$CH$_2$—, n+m≈135, X is —CH$_2$CH$_2$CH$_2$— or —CH(CH$_3$)CH$_2$—, Y is —OCH$_2$CH$_2$—, and p is 7 or 8) in which the hydroxyl group of the silicone with at one terminal position composed of polydimethylsiloxane having a molecular weight of 10000 and polyoxyethylene having a molecular weight of 400 was modified with a carboxyl group.

Example 8

50 g of the silicone with hydroxyl group at one terminal position prepared according to the step (I) in Example 4, and 1.4 g of succinic anhydride were put into a 100-ml four-neck flask equipped with a magnetic stirrer and a thermometer.

The contents of the flask were heated at 200° C., and kept stirred at the elevated temperature. After 4 hours, heating and stirring this was stopped.

The reaction mixture was cooled to room temperature, and then diluted with 50 g of toluene added thereto. With that the insoluble succinic anhydride was removed through filtration. Next, the non-reacted succinic anhydride and the volatile component were evaporated away under reduced pressure by the use of an evaporator. Thus was obtained 49 g of a transparent pale-yellow liquid.

The transparent pale-yellow liquid had a water content of 530 ppm, and a refractive index of 1.4098 (25° C.). Its IR and $^1$H-NMR spectral charts confirmed that the liquid is a modified carboxyl-terminated polydimethylsiloxane (of formula (1-a) where $R^1$, $R^3$, $R^4$ and $R^5$ are methyl, $R^2$ is butyl, $R^7$ is —CH$_2$CH$_2$—, n+m≈65, X is —CH$_2$CH$_2$CH$_2$— or —CH(CH$_3$)CH$_2$—, Y is —OCH$_2$CH$_2$—, and p is 3 or 4) composed of polydimethylsiloxane having a molecular weight of 5000 of Example 4 and polyoxyethylene having a molecular weight of 200.

Example 9

50 g of silicone with hydroxyl group at one terminal position having a molecular weight of 1000 (Chisso's FM-0411—this has a hydroxyl equivalent of 1108, and corresponds to formula (5-a) where $R^1$, $R^3$, $R^4$ and $R^5$ are methyl, $R^2$=—C$_4$H$_9$, n+m≈11, X=—CH$_2$CH$_2$CH$_2$—, Y=—OCH$_2$CH$_2$—, and p=1), and 13 g of trimellitic acid anhydride were put into a 100-ml four-neck flask equipped with a magnetic stirrer and a thermometer.

The contents of the flask were heated at 200° C., and kept stirred for 5 hours at the temperature.

This was cooled to room temperature, to which were added 400 g of toluene, 250 g of water and 50 g of acetone. This was further processed twice with 200 g of water, whereby the non-reacted compounds and the side products were extracted out into the aqueous phase.

Next, the aqueous phase was removed, and the solvent and the volatile component were evaporated away under reduced pressure from the organic phase by the use of an evaporator. Thus was obtained 41 g of a pale-yellow greasy substance.

The pale-yellow greasy substance had a water content of 950 ppm, an acid value of 26.1 (KOH mg/g), and a refractive index of 1.4218 (25° C.).

Figure 15:
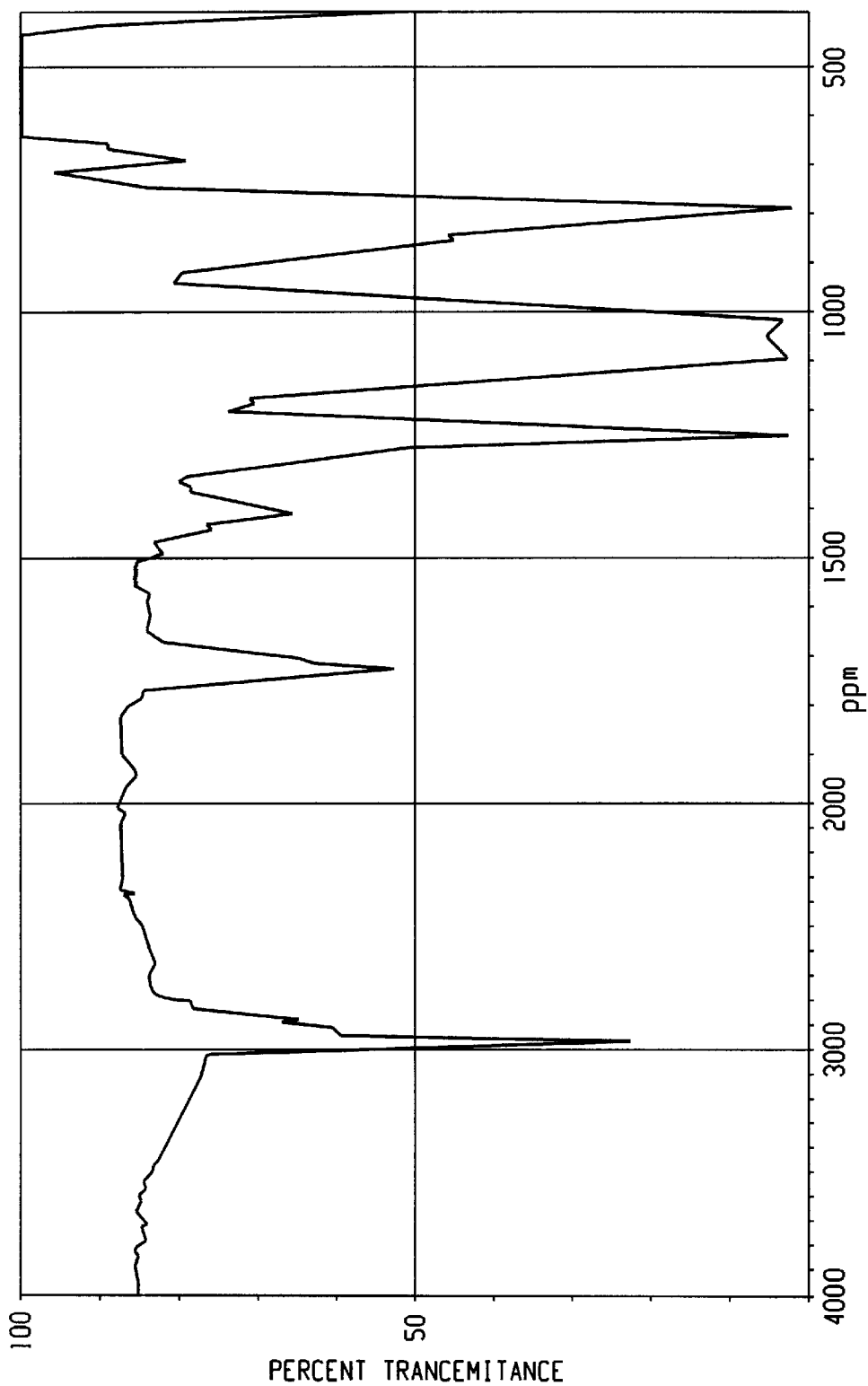
FIG. 15 is an IR spectral chart of the modified polyorganosiloxane with dicarboxyl groups at one terminal position in Example 9.
Figure 16:
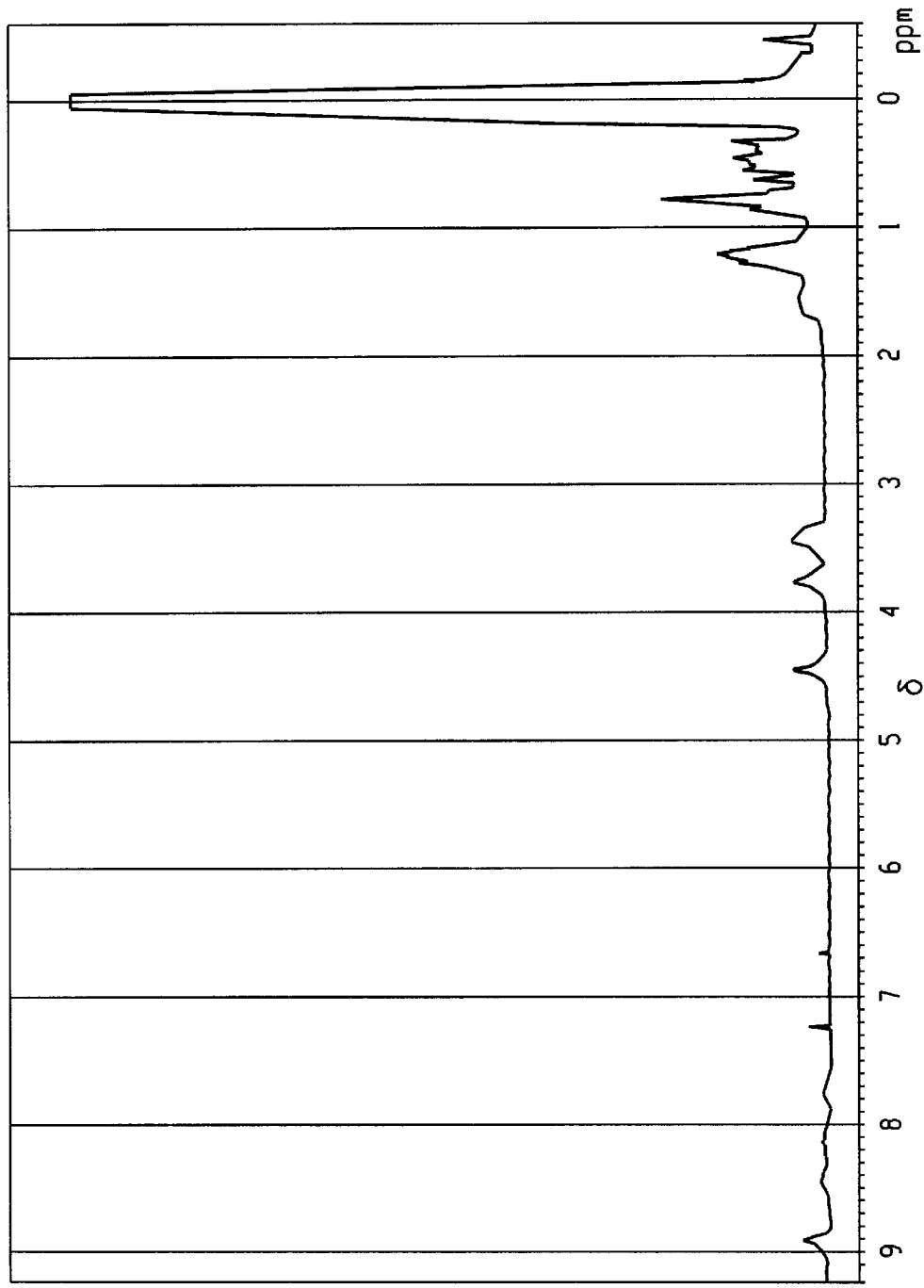
FIG. 16 is a $^1$H-NMR spectral chart of the modified polyorganosiloxane with dicarboxyl groups at one terminal position in Example 9.

Its IR spectral chart is in FIG. 15; and its $^1$H-NMR spectral chart is in FIG. 16. The pattern appearing at 1710 to 1760 cm$^{-1}$ in the IR spectral chart indicates the absorption by the carbonyl C=O in COOH and —COO— of the compound produced.

The data confirmed that the pale-yellow greasy substance obtained herein is a modified carboxyl-terminated polydimethylsiloxane (of formula (1-b) where $R^7$ is =C$_6$H$_2$=) in which the hydroxyl group of the silicone with hydroxyl group at one terminal position having a molecular weight of 1000 was modified with a dicarboxyl group.

Example 10

50 g of silicone with hydroxyl group at one terminal position having a molecular weight of 5000 (Chisso's FM-0421—this has a hydroxyl equivalent of 4861, and corresponds to formula (5-a) where $R^1$, $R^3$, $R^4$ and $R^5$ are methyl, $R^2$=—C$_4$H$_9$, n+m≈65, X —CH$_2$CH$_2$CH$_2$—, Y=—OCH$_2$CH$_2$—, and p=1), 2.2 g of trimellitic acid anhydride, 1.0 g of toluene and 50 g of acetone were put into a 300-ml four-neck flask equipped with a magnetic stirrer and a thermometer.

The contents of the flask were heated at 57° C., and 2.9 ml of triethylamine was dropwise added thereto with stirring. Then, this was kept stirred at 57° C. for 7 hours.

This was cooled to room temperature, and 2.0 g of water and 2.4 g of acetic acid were added thereto in that order. This was again stirred, whereby the non-reacted trimellitic acid anhydride therein was converted into trimellitic acid and triethylamine was into its acetate. As a result, the reaction mixture became cloudy.

10 g of methanol, 150 g of toluene, 150 g of water and 50 g of acetone were added to this, and this was further processed twice with 150 g of water, whereby the side products and the non-reacted compounds were extracted out into the aqueous phase.

Next, the aqueous phase was removed, and the solvent and the volatile component were evaporated away under reduced pressure from the organic phase by the use of an evaporator. Thus was obtained 51 g of a pale-yellow greasy substance.

Figure 17:
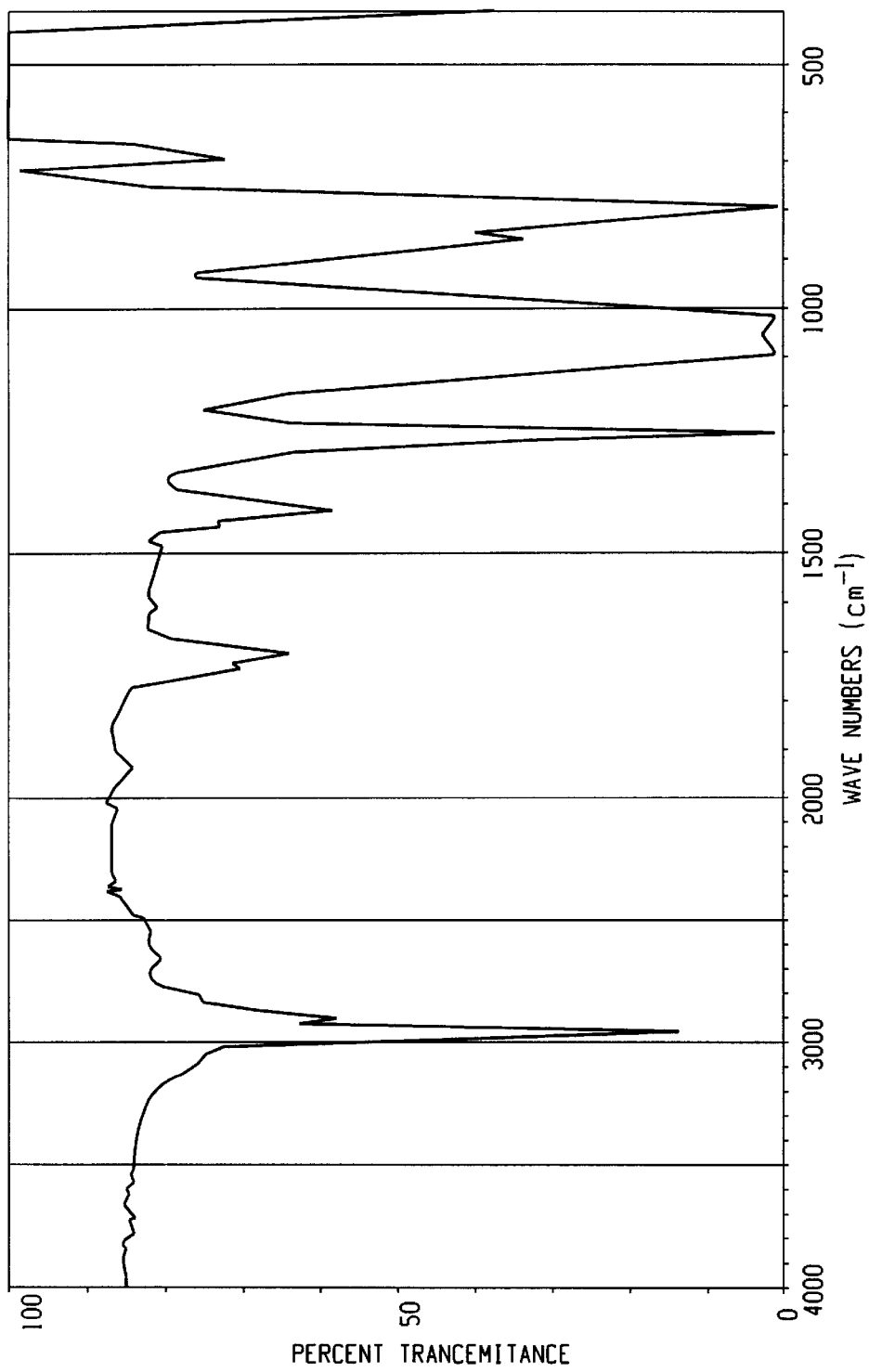
FIG. 17 is an IR spectral chart of the modified polyorganosiloxane with dicarboxyl groups at one terminal position in Example 10.
Figure 18:
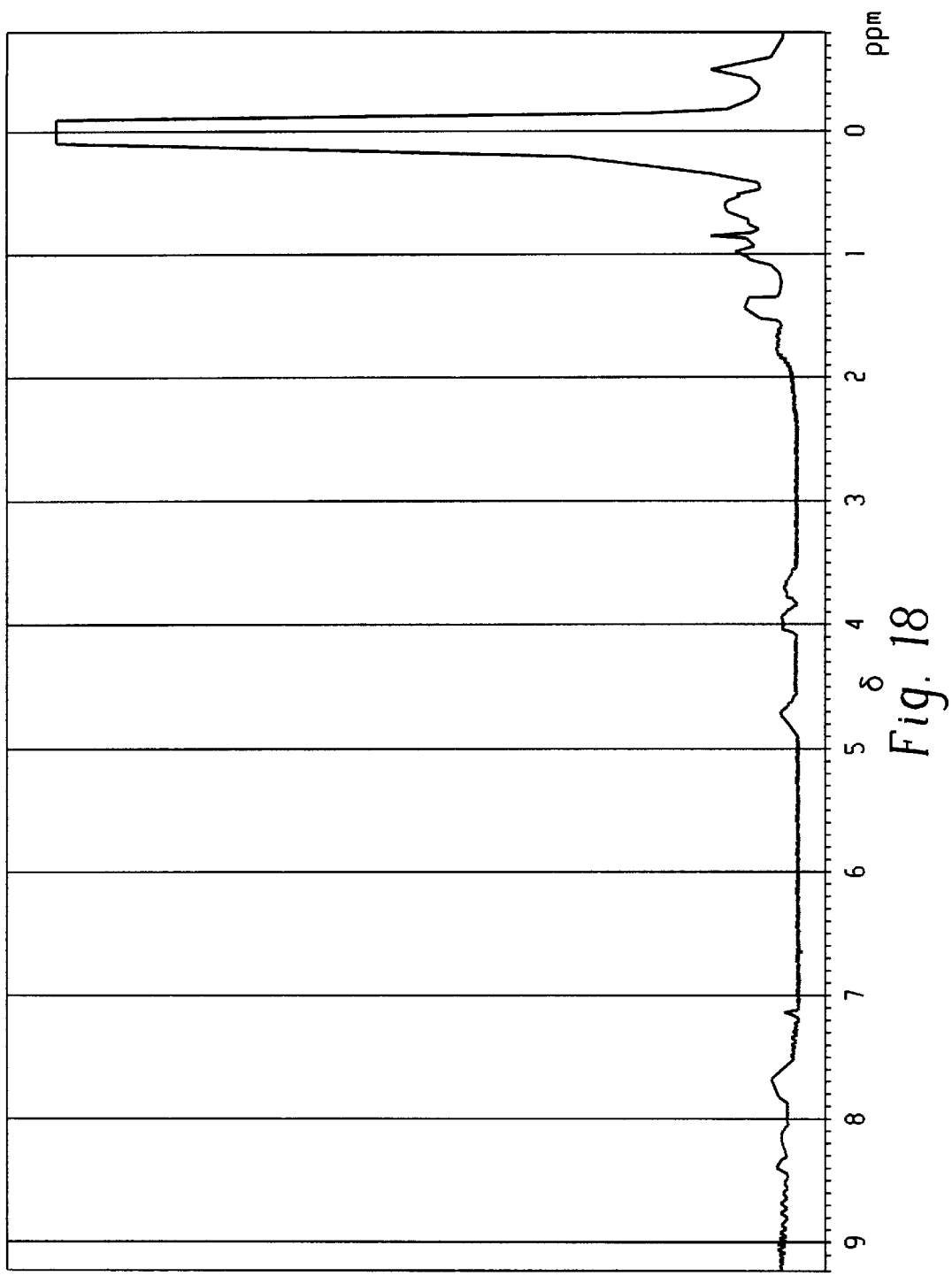
FIG. 18 is a $^1$H-NMR spectral chart of the modified polyorganosiloxane with dicarboxyl groups at one terminal position in Example 10.

Its IR spectral chart is in FIG. 17; and its $^1$H-NMR spectral chart is in FIG. 18. The pattern appearing at 1710 to 1760 cm$^{-1}$ in the IR spectral chart indicates the absorption by the carbonyl C=O in COOH and —COO— of the compound produced.

The data confirmed that the pale-yellow greasy substance obtained herein is a modified carboxyl-terminated polydimethylsiloxane (of formula (1-b) where R$^7$ is =C$_6$H$_2$=) in which the hydroxyl group of the silicone with hydroxyl group at one terminal position having a molecular weight of 5000 was modified with a dicarboxyl group.

Example 11

50 g of the silicone with hydroxyl group at one terminal position prepared according to the step (I) in Example 4, 2.8 g of trimellitic acid anhydride and 50 g of acetone were put into a 200-ml four-neck flask equipped with a magnetic stirrer and a thermometer.

The contents of the flask were heated at 57° C., and 3.7 ml of triethylamine was dropwise added thereto with stirring. Then, this was kept stirred at 57° C. for 7 hours.

This was cooled to room temperature, and 2.6 g of water and 3.1 g of acetic acid were added thereto in that order. This was again stirred, whereby the non-reacted trimellitic acid anhydride therein was converted into trimellitic acid and triethylamine was into its acetate. As a result, the reaction mixture became pale yellow.

100 g of toluene, 100 g of water, 100 g of acetone and 50 g of hexane were added to this, and this was further processed twice with 100 g of water and 50 g of acetone, whereby the side products and the non-reacted compounds were extracted out into the aqueous phase.

Next, the aqueous phase was removed, and the solvent and the volatile component were evaporated away under reduced pressure from the organic phase by the use of an evaporator. Thus was obtained 52 g of a pale-yellow greasy substance.

The pale-yellow greasy substance had an acid value of 22.8 (KOH mg/g), and a refractive index of 1.4136 (25° C.).

Figure 19:
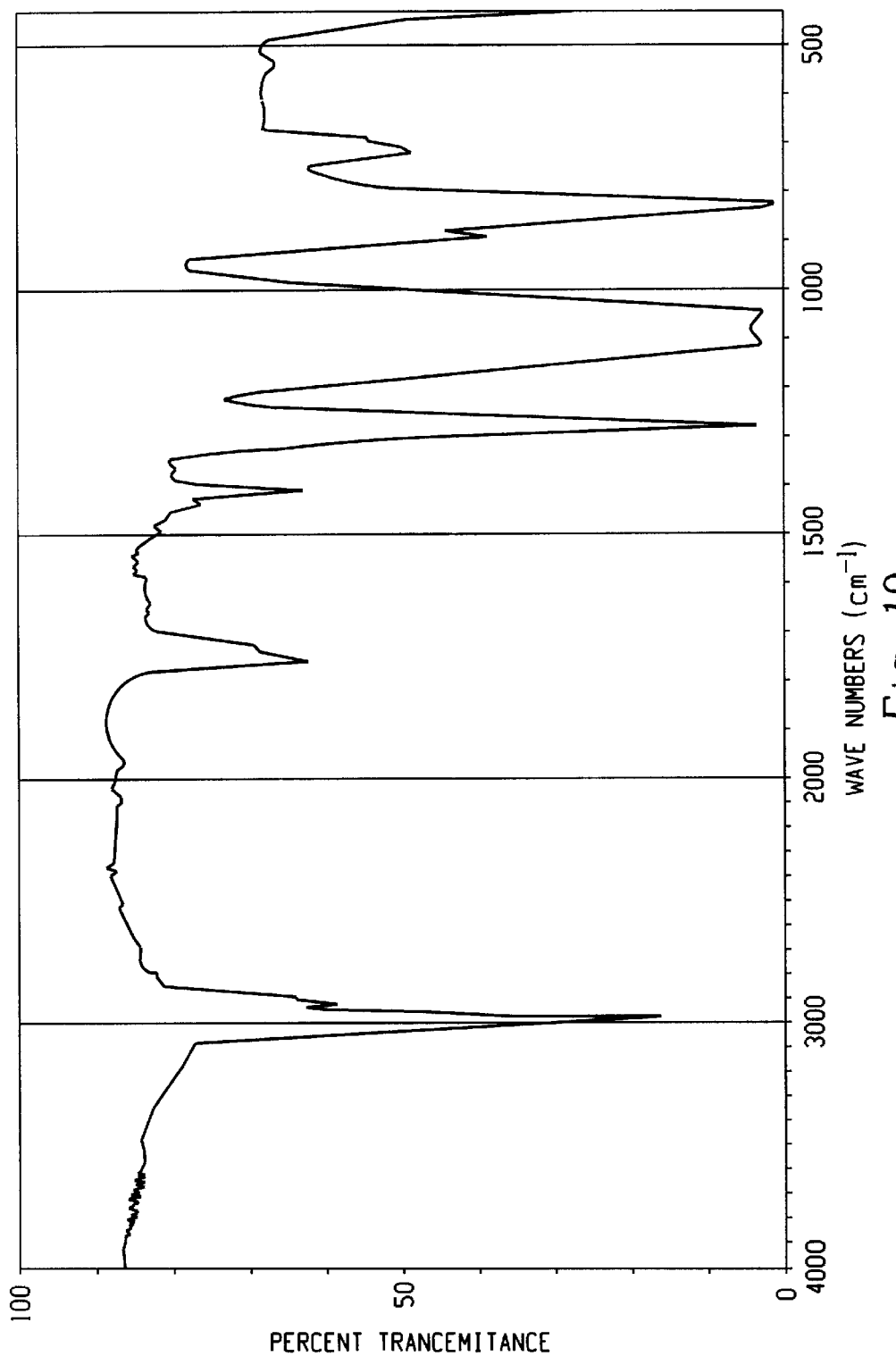
FIG. 19 is an IR spectral chart of the modified polyorganosiloxane with dicarboxyl groups at one terminal position in Example 11.
Figure 20:
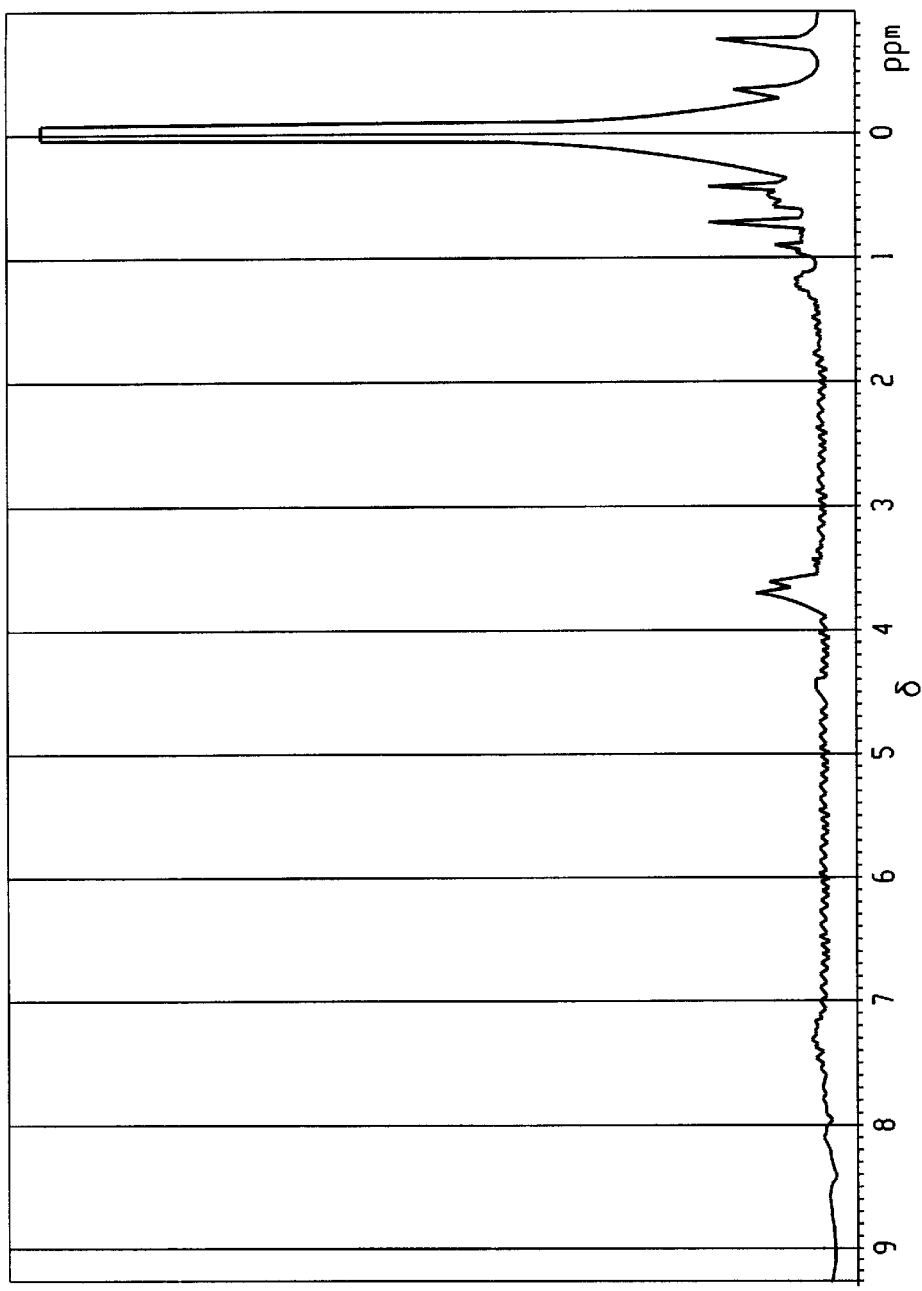
FIG. 20 is a $^1$H-NMR spectral chart of the modified polyorganosiloxane with dicarboxyl groups at one terminal position in Example 11.

Its IR spectral chart is in FIG. 19; and its $^1$H-NMR spectral chart is in FIG. 20. The pattern appearing at 1710 to 1760 cm$^{-1}$ in the IR spectral chart indicates the absorption by the carbonyl C=O in COOH and —COO— of the compound produced.

The data confirmed that the pale-yellow greasy substance obtained herein is a modified carboxyl-terminated polydimethylsiloxane (of formula (1-b) where R$^1$, R$^3$, R$^4$ and R$^5$ are methyl, R$^2$ is butyl, R$^7$ is =C$_6$H$_2$=, n+m≈65, X is —CH$_2$CH$_2$CH$_2$— or —CH(CH$_3$)CH$_2$—, Y is —OCH$_2$CH$_2$—, and p is 3 or 4) in which the hydroxyl group of the silicone with hydroxyl group at one terminal position silicone composed of polydimethylsiloxane having a molecular weight of 5000 and polyoxyethylene having a molecular weight of 200 was modified with a dicarboxyl group.

Example 12

Herein used was a 300 ml four-neck flask equipped with a 100-ml dropping funnel, a magnetic stirrer and a thermometer. 50 g of the silicone with hydroxyl group at one terminal position prepared according to the step (I) in Example 4 was dissolved in 25 g of acetone, and the resulting solution was fed into the dropping funnel.

4.3 g of pyromellitic acid anhydride, 2.6 g of triethylamine and 50 g of acetone were put into the flask. The contents of the flask were heated at 55° C., and kept stirred. With that, the solution in acetone of the hydroxyl-semiterminated silicone was dropwise added thereto through the dropping funnel over a period of 2 hours. Then, this was kept stirred at an elevated temperature of 57° C. for 6 hours.

This was cooled to room temperature, and 7.0 g of water and 3.1 g of acetic acid were added thereto in that order. This was again stirred, whereby the non-reacted pyromellitic acid anhydride therein was converted into pyromellitic acid and triethylamine was into its acetate. As a result, the reaction mixture became light brown.

150 g of toluene, 150 g of water and 200 g of acetone were added to this, and this was further processed with 50 g of water and 50 g of acetone, whereby the side products and the non-reacted compounds were extracted out into the aqueous phase. The extraction was repeated twice.

Next, the aqueous phase was removed, and the solvent and the volatile component were evaporated away under reduced pressure from the toluene phase by the use of an evaporator. Thus was obtained 49 g of a viscous, dark brown substance.

The viscous, dark brown substance had a water content of 100 ppm, an acid value of 29.8 (KOH mg/g) and a refractive index of 1.4157 (25° C.)

Figure 21:
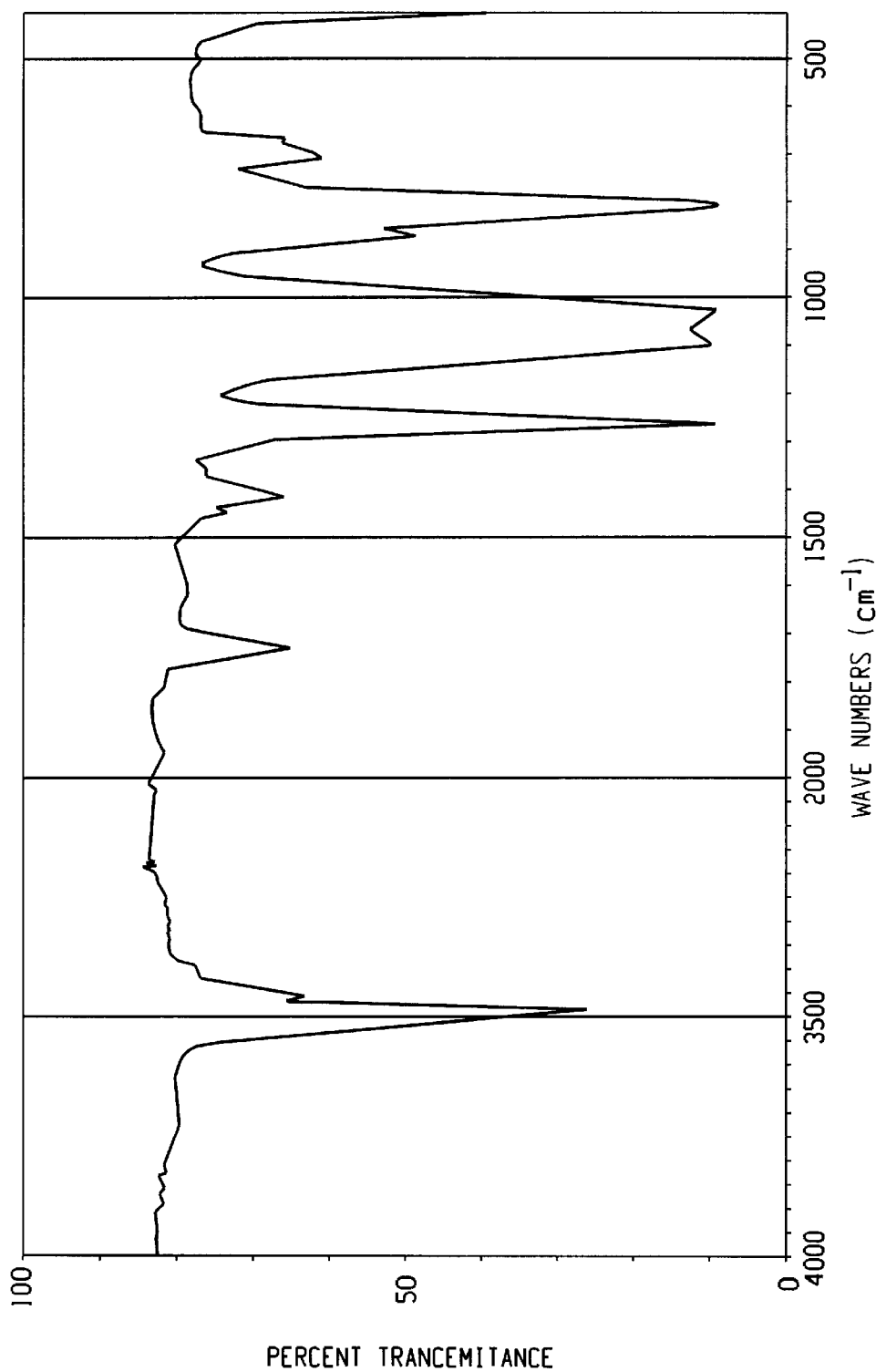
FIG. 21 is an IR spectral chart of the modified polyorganosiloxane with tricarboxyl groups at one terminal position in Example 12.
Figure 22:
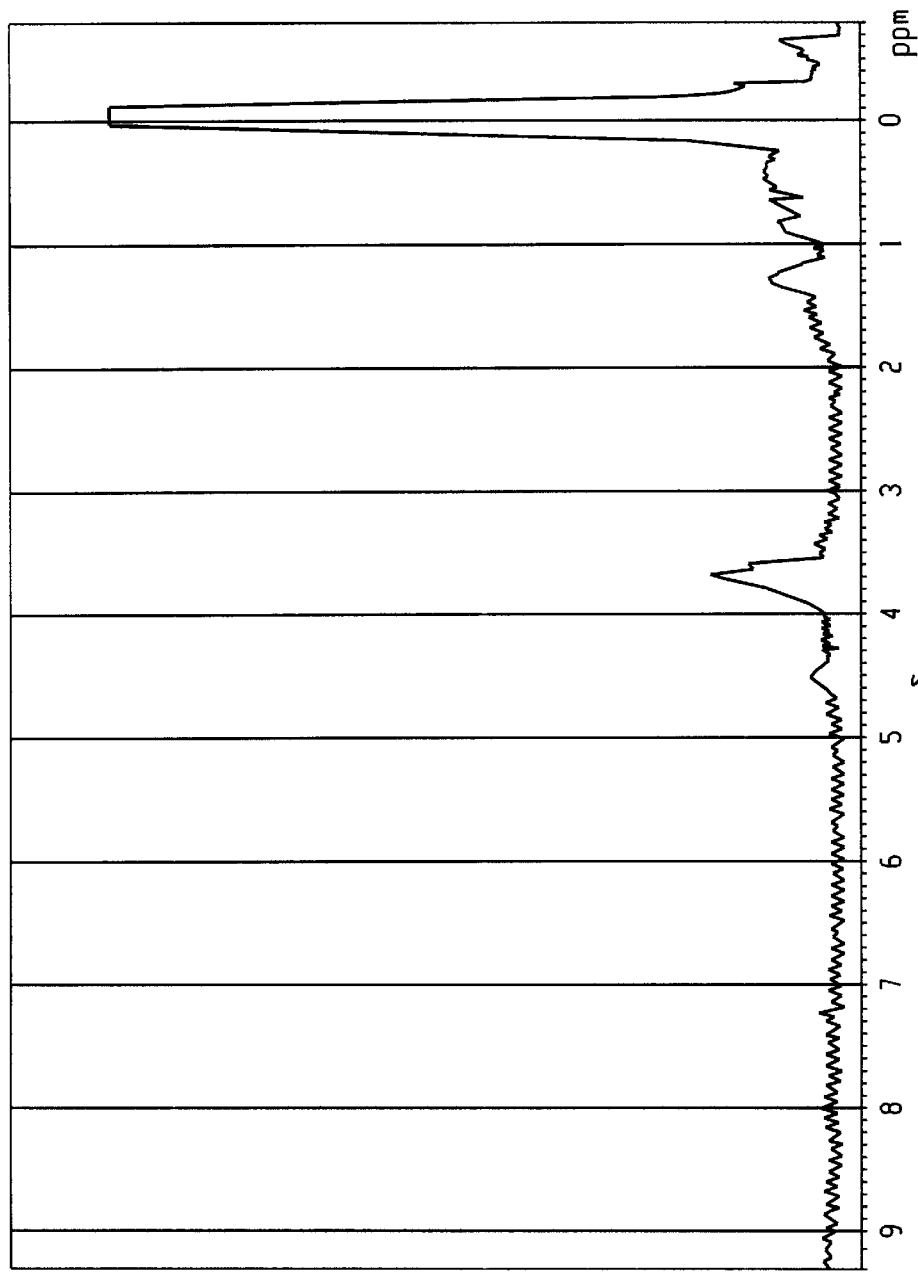
FIG. 22 is a $^1$H-NMR spectral chart of the modified polyorganosiloxane with tricarboxyl groups at one terminal position in Example 12.

Its IR spectral chart is in FIG. 21; and its $^1$H-NMR spectral chart is in FIG. 22. The pattern appearing at 1710 to 1760 cm$^{-1}$ in the IR spectral chart indicates the absorption by the carbonyl C=O in COOH and —COO— of the compound produced.

The data confirmed that the viscous, dark brown substance obtained herein is a modified carboxyl-terminated polydimethylsiloxane (of formula (1-c) where R$^1$, R$^3$, R$^4$ and R$^5$ are methyl, R$^2$ is butyl, R$^7$ is =C$_6$H$_2$=, n+m≈65, X is —CH$_2$CH$_2$CH$_2$— or —CH(CH$_3$)CH$_2$—, Y is —OCH$_2$CH$_2$—, and p is 3 or 4) in which the hydroxyl group of the silicone with hydroxyl group at one terminal position composed of polydimethylsiloxane having a molecular weight of 5000 and polyoxyethylene having a molecular weight of 200 was modified with a tricarboxyl group.

Example 13

50 g of silicone with dihydroxyl group at one terminal position silicone having a molecular weight of 1000 (Chisso's FM-DA11—this has a hydroxyl equivalent of 674, and corresponds to formula (5-b) where R$^1$, R$^3$, R$^4$ and R$^5$ are methyl, R$^2$ is —C$_4$H$_9$, R$^6$ is —C$_2$H$_5$, n+m≈11, X is —CH$_2$CH$_2$CH$_2$—, Y=—OCH$_2$—, and p=1), 11.1 g of succinic anhydride, 1.0 g of toluene and 50 g of acetone were put into a 200-ml three-neck flask equipped with a magnetic stirrer, a thermometer and a 20-ml dropping funnel, and 3.8 g of triethylamine was into the dropping funnel.

The contents of the flask were heated at 55° C., and kept stirred by rotating the magnetic stirrer. With that, triethylamine was dropwise added thereto through the dropping funnel. After the addition, stirring it was continued still at 55° C.

The reduction in the amount of succinic anhydride in the reaction system was traced by periodically sampling the reaction mixture and analyzing it through GC, and it stopped after 6 hours. With that, heating and stirring the system was stopped.

This was cooled to room temperature, and 20 g of water and 4.5 g of acetic acid were added thereto in that order. This was again stirred, whereby the non-reacted succinic anhydride therein was converted into succinic acid and triethylamine was into its acetate. As a result, the reaction mixture became cloudy.

The reaction mixture was put into a separating funnel along with 100 g of toluene and 50 g of water, and the side products and the non-reacted compounds in the mixture was extracted out into the aqueous phase. The extraction with water was repeated three times. Next, the solvent and the volatile component were evaporated away from the extraction residue, toluene phase under reduced pressure, for which was used an evaporator. Then, the residue was filtered, and 57 g of a transparent pale-yellow liquid was obtained.

The transparent pale-yellow liquid had a viscosity of at least 500 mm$^2$/sec (25° C.), a water content of 290 ppm, an acid value of 62.6 (KOH mg/g), and a refractive index of 1.4230 (25° C.)

Figure 23:
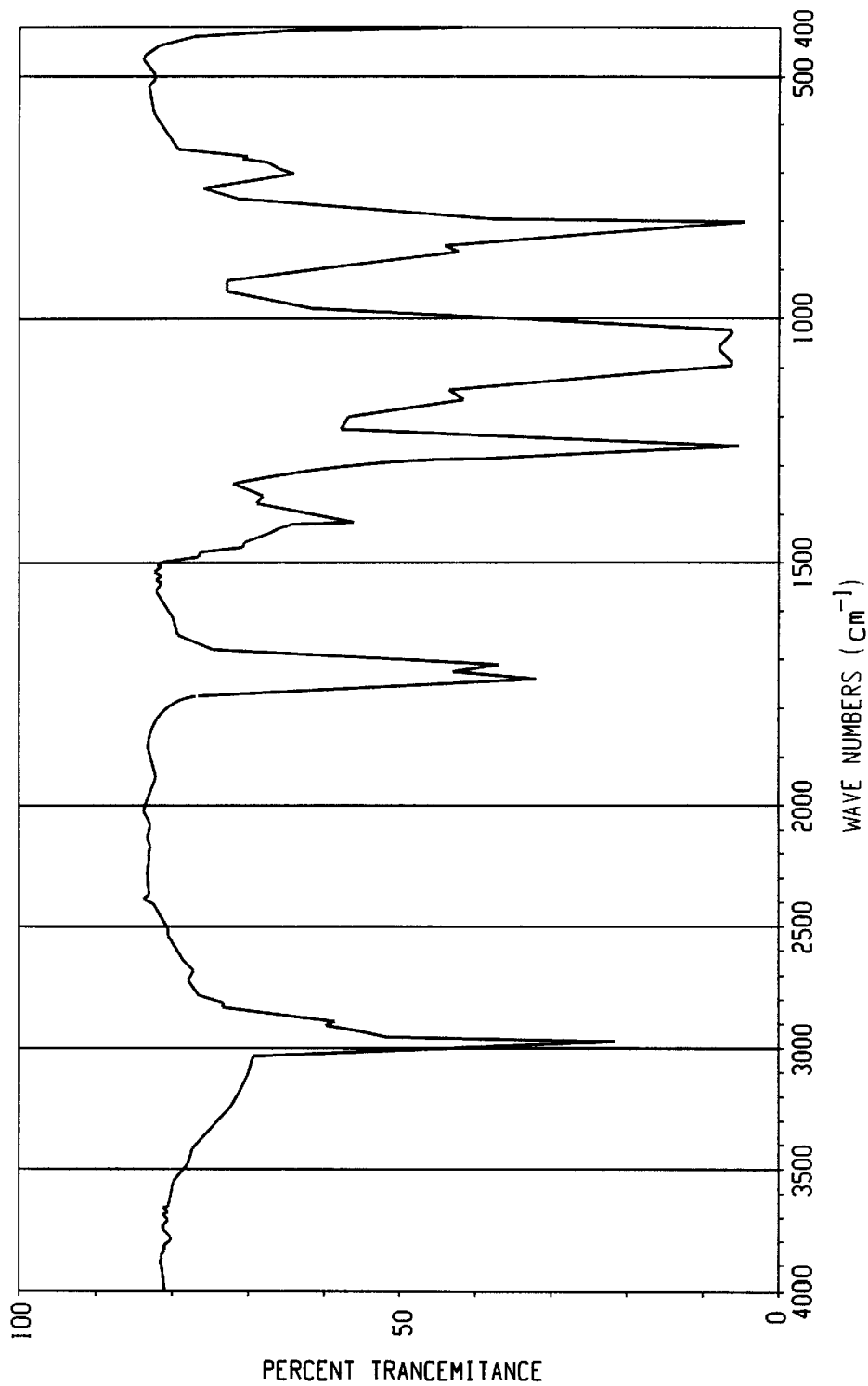
FIG. 23 is an IR spectral chart of the modified polyorganosiloxane with dicarboxyl groups at one terminal position in Example 13.
Figure 24:
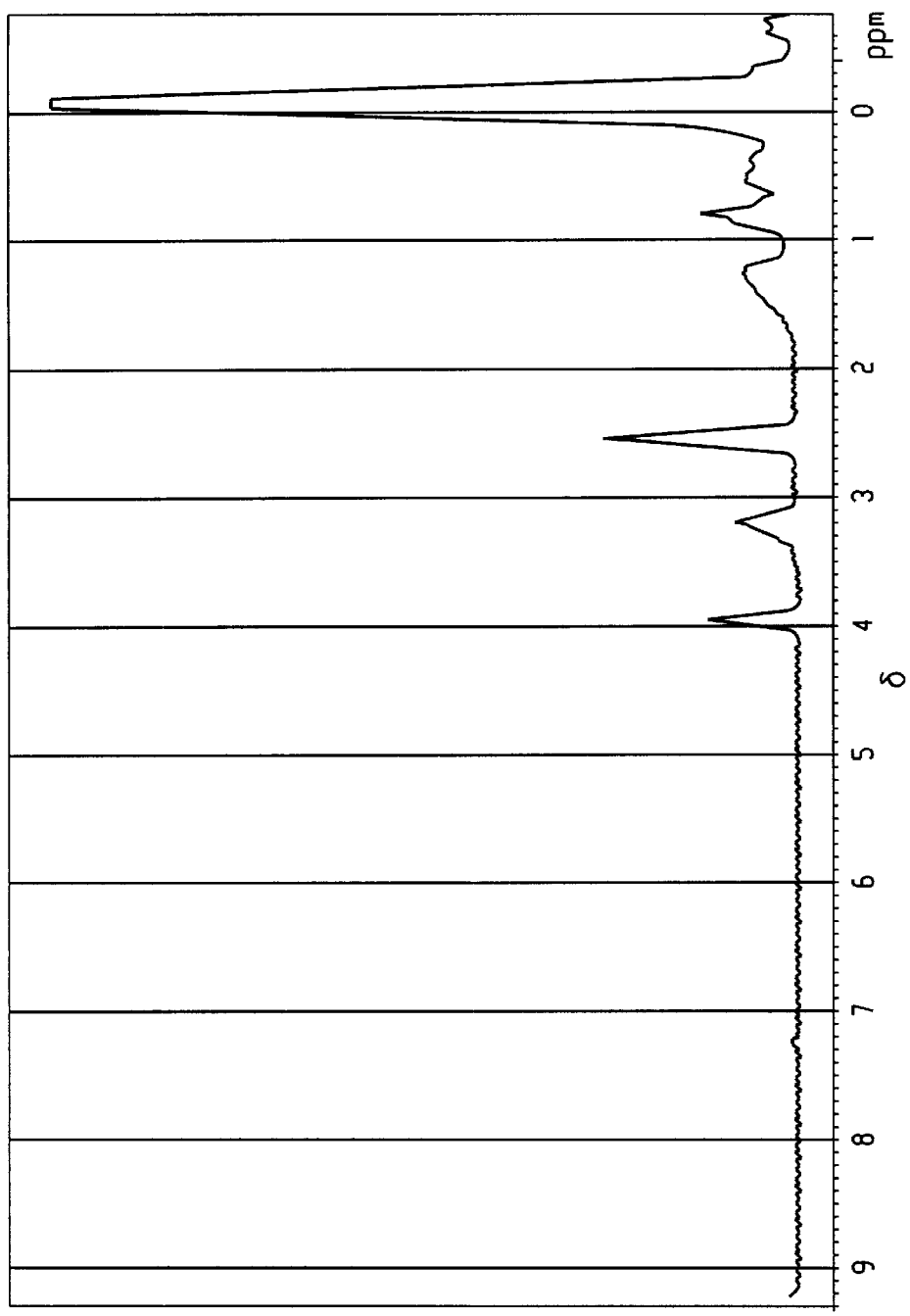
FIG. 24 is a $^1$H-NMR spectral chart of the modified polyorganosiloxane with dicarboxyl groups at one terminal position in Example 13.

Its IR spectral chart is in FIG. 23; and its $^1$H-NMR spectral chart is in FIG. 24. The pattern appearing at 1710 to 1760 cm$^{-1}$ in the IR spectral chart indicates the absorption by the carbonyl C=O in COOH and —COO— of the compound produced.

The data confirmed that the transparent pale-yellow liquid obtained herein is a modified carboxyl-terminated polydimethylsiloxane (of formula (1-d) where $R^7$ is —CH$_2$CH$_2$—) in which the dihydroxyl group of the silicone with dihydroxyl group at one terminal position having a molecular weight of 1000 was modified with a dicarboxyl group.

Example 14

50 g of silicone with dihydroxyl group at one terminal position having a molecular weight of 5000 (Chisso's FM-DA21—this has a hydroxyl equivalent of 2133, and corresponds to formula (5-b) where $R^1$, $R^3$, $R^4$ and $R^5$ are methyl, $R^2$ is —C$_4$H$_9$, $R^6$ is —C$_2$H$_5$, n+m≈65, X is —CH$_2$CH$_2$CH$_2$—, Y=—OCH$_2$—, and p=1), 3.5 g of succinic anhydride, 1.0 g of toluene and 50 g of acetone were put into a 200-ml three-neck flask equipped with a magnetic stirrer, a thermometer and a 20-ml dropping funnel, and 1.2 g of triethylamine was into the dropping funnel.

The contents of the flask were heated at 55° C., and kept stirred by rotating the magnetic stirrer. With that, triethylamine was dropwise added thereto through the dropping funnel. After the addition, stirring it was continued still at 55° C.

The reduction in the amount of succinic anhydride in the reaction system was traced by periodically sampling the reaction mixture and analyzing it through GC, and it stopped after 7 hours. With that, heating and stirring the system was stopped.

This was cooled to room temperature, and 6.3 g of water and 1.4 g of acetic acid were added thereto in that order. This was again stirred, whereby the non-reacted succinic anhydride therein was converted into succinic acid and triethylamine was into its acetate. As a result, the reaction mixture became cloudy.

The reaction mixture was put into a separating funnel along with 100 g of toluene and 50 g of water , and the side products and the non-reacted compounds in the mixture was extracted out into the aqueous phase. In addition, this was further extracted twice with 50 g of water and 25 g of acetone. Next, the solvent and the volatile component were evaporated away from the extraction residue, toluene phase under reduced pressure, for which was used an evaporator. Then, the residue was filtered, and 51 g of a transparent pale-yellow liquid was obtained.

The transparentpale-yellow liquid had a viscosity of at least 500 mm$^2$/sec (25° C.), a water content of 140 ppm, an acid value of 18.7 (KOH mg/g), and a refractive index of 1.4096 (25° C.).

Figure 25:
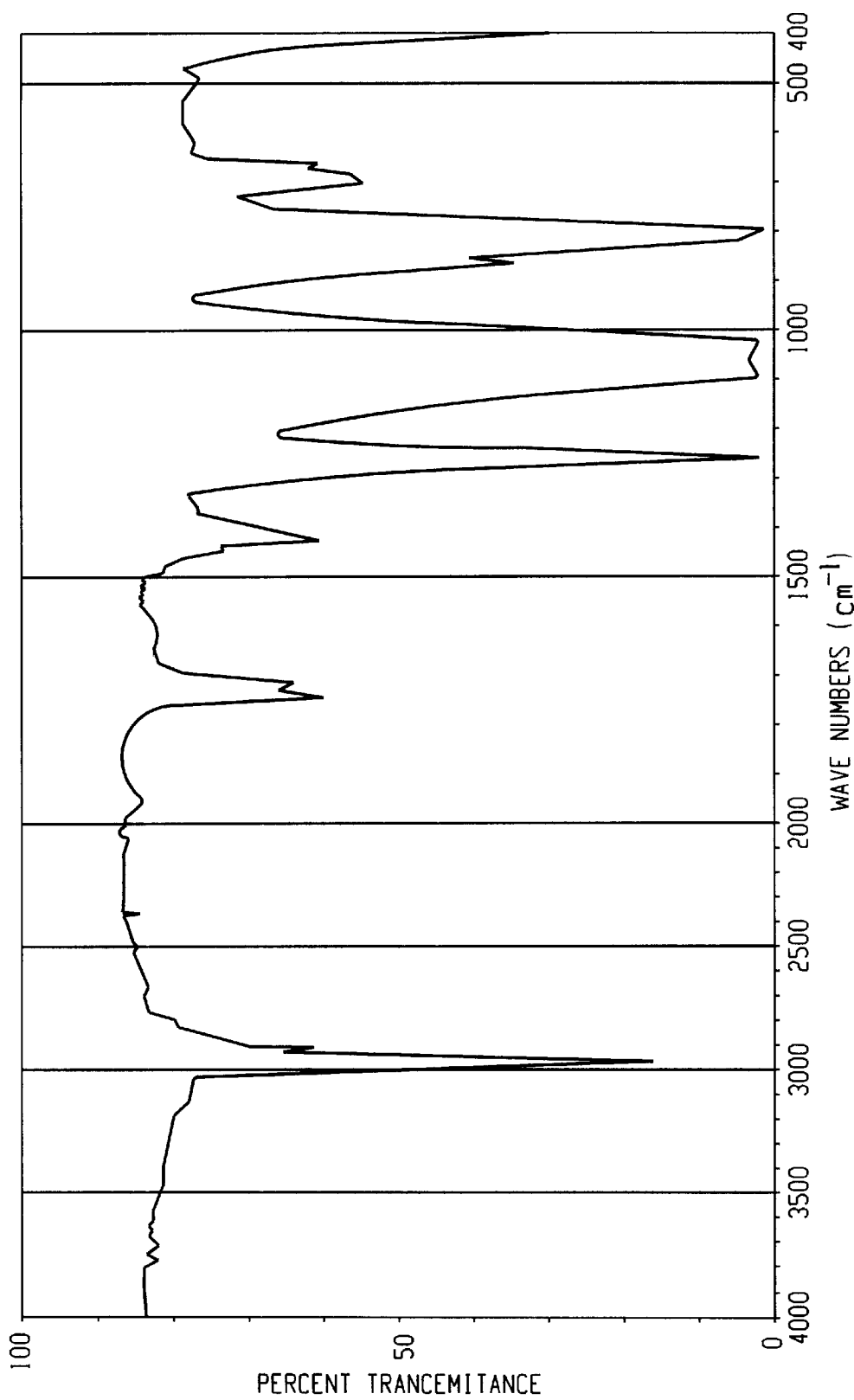
FIG. 25 is an IR spectral chart of the modified polyorganosiloxane with dicarboxyl groups at one terminal position in Example 14.
Figure 26:
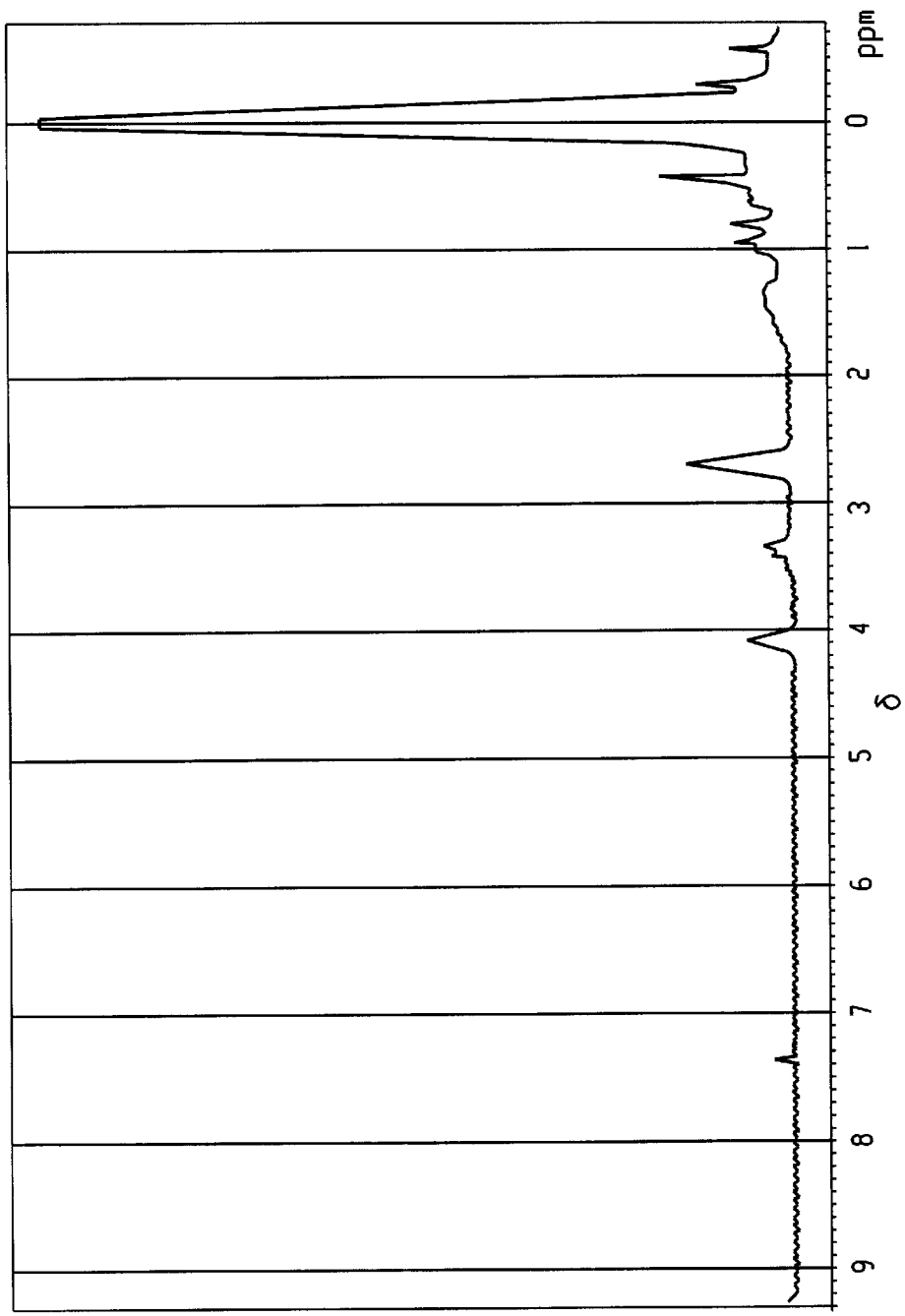
FIG. 26 is a $^1$H-NMR spectral chart of the modified polyorganosiloxane with dicarboxyl groups at one terminal position in Example 14.

Its IR spectral chart is in FIG. 25; and its $^1$H-NMR spectral chart is in FIG. 26. The pattern appearing at 1710 to 1760 cm$^{-1}$ in the IR spectral chart indicates the absorption by the carbonyl C=O in COOH and —COO— of the compound produced.

The data confirmed that the transparent pale-yellow liquid obtained herein is a modified carboxyl-terminated polydimethylsiloxane (of formula (1-d) where $R^7$ is —CH$_2$CH$_2$—) in which the dihydroxyl group of the silicone with dihydroxyl group at one terminal position having a molecular weight of 5000 was modified with a dicarboxyl group.

Example 15

One g of the polyorganosiloxane obtained in Example 4 was put into a screw tube along with 1 g of each solvent indicated in Table 1, and shaken to check its miscibility with the solvent. The result is shown in Table 1.

Example 16

One g of the polyorganosiloxane obtained in Example 5 was put into a screw tube along with 1 g of each solvent indicated in Table 1, and shaken to check its miscibility with the solvent. The result is shown in Table 1.

Comparative Example 1

One g of carboxyl-terminated polyorganosiloxane having a number-average molecular weight of 5000 and represented by the following formula (13):

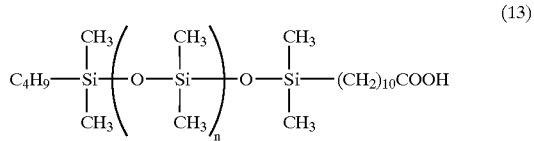

(13)

was put into a screw tube along with 1 g of each solvent indicated in Table 1, and shaken to check its miscibility with the solvent. The result is shown in Table 1.

Example 17

One g of the polyorganosiloxane obtained in Example 6 was put into a screw tube along with 1 g of each solvent indicated in Table 1, and shaken to check its miscibility with the solvent. The result is shown in Table 1.

Example 18

One g of the polyorganosiloxane obtained in Example 7 was put into a screw tube along with 1 g of each solvent indicated in Table 1, and shaken to check its miscibility with the solvent. The result is shown in Table 1.

Comparative Example 2

One g of a modified carboxyl-terminated polyorganosiloxane having a number-average molecular weight of 10000 and represented by the formula (6) was put into a screw tube along with 1 g of each solvent indicated in Table 1, and shaken to check its miscibility with the solvent. The result is shown in Table 1.

In Table 1, "◯" indicates that the sample completely dissolved; and "×" indicates that the sample did not dissolve but formed two separate phases. As in Table 1, the polyorganosiloxanes of the invention uniformly dissolved in various solvents, as compared the conventional, modified carboxyl-terminated polyorganosiloxanes not having a polyoxyalkylene moiety. Specifically, the polyorganosiloxanes of the invention do not lose the miscibility with solvents with which conventional polyorganosiloxanes are miscible, and their miscibility with various solvents is obviously improved. Therefore, using them in various applications is easy.

TABLE 1

| Sample | Example 15 | Example 16 | Comp. Example 1 | Example 17 | Example 18 | Comp. Example 2 |
|---|---|---|---|---|---|---|
| Composition (silicone + PEG) | 5000 + 200 | 5000 + 400 | 5000 | 10000 + 2000 | 10000 + 400 | 10000 |
| Hexane | ○ | ○ | ○ | ○ | ○ | ○ |
| Toluene | ○ | ○ | ○ | ○ | ○ | ○ |
| Ethyl Acetate | ○ | ○ | ○ | ○ | ○ | ○ |
| 2-Propanol | ○ | ○ | ○ | ○ | ○ | ○ |
| Acetone | ○ | ○ | ○ | ○ | ○ | x |
| Ethanol | ○ | ○ | x | x | x | x |
| Acetic Acid | x | ○ | x | x | x | x |

*Gelled entirely.

The invention provides novel, a modified carboxyl-terminated polyorganosiloxanes. The method for producing the modified polyorganosiloxanes of the invention is characterized in that it does not require plural reaction steps. In addition, according to the method, various types of modified polyorganosiloxanes can be easily obtained, depending on the dicarboxylic acid anhydrides used. In particular, the modified carboxyl-terminated polyorganosiloxanes having at least two carboxyl groups at one terminal position, and those having polyoxyalkylene segments between the terminal carboxyl group and the polysiloxane segments are highly miscible with various polar solvents and monomers, and their grafting and polycondensing ability is high. Accordingly, using the modified polyorganosiloxanes of the invention in various applications is easy.

While the invention has been described in detail and with reference to specific embodiments thereof, it will be apparent to one skilled in the art that various changes and modifications can be made therein without departing from the spirit and scope thereof.

What is claimed is:

1. A modified carboxyl-terminated polyorganosiloxane having a mean molecular weight of from 500 to 120,000 and represented by the following general formula (1):

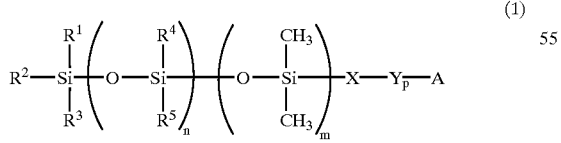

(1)

wherein $R^1$, $R^2$, $R^3$, $R^4$ and $R^5$ each represent a linear or branched alkyl group having from 1 to 20 carbon atoms, an aryl-containing group having from 6 to 10 carbon atoms, or a cycloalkyl group having from 4 to 10 carbon atoms; n and m each represent a number of 0, 1 or more; n+m indicates a number to satisfy the mean molecular weight, from 500 to 100,000, of the polysiloxane segment; X represents an alkylene group having from 2 to 20 carbon atoms; Y represents an oxyalkylene group having from 1 to 3 carbon atoms; p represents a number to satisfy the mean molecular weight, from 30 to 20,000, of the polyoxyalkylene segment Yp; and A represents a substituent having from 1 to 6 carboxyl groups.

2. The modified carboxyl-terminated polyorganosiloxane as claimed in claim 1, wherein p is a number to satisfy the mean molecular weight, from 120 to 20,000, of the polyoxyalkylene segment Yp.

3. The modified carboxyl-terminated polyorganosiloxane as claimed in claim 1, wherein A is a substituent Z having from 1 to 3 carboxyl groups.

4. The modified carboxyl-terminated polyorganosiloxane as claimed in claim 1, wherein A is a substituent of the following general formula (2):

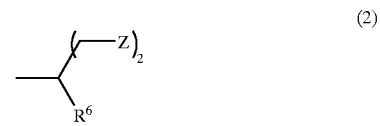

(2)

wherein $R^6$ represents a hydrogen atom, a linear or branched alkyl group having from 1 to 5 carbon atoms, or an aryl group having from 6 to 10 carbon atoms; and Z represents a substituent having from 1 to 3 carboxyl groups.

5. The modified carboxyl-terminated polyorganosiloxane as claimed in claim 3, wherein Z is a substituent of the following general formula (3):

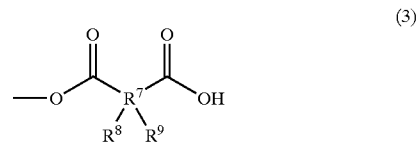

(3)

wherein $R^7$ represents a polyvalent alkyl-, alkenyl, aryl, or arylalkyl radical that may optionally contain functional groups selected from carbonyl groups, sulfone groups, ethereal oxygen groups, amine groups, and trifluoromethyl groups; and $R^8$ and $R^9$ each represent a hydrogen atom or a carboxyl group; and $R^8$ and $R^9$ each represent a hydrogen atom or a carboxyl group.

6. The modified carboxyl-terminated polyorganosiloxane as claimed in claim 3, wherein Z is a substituent of the following general formula (4):

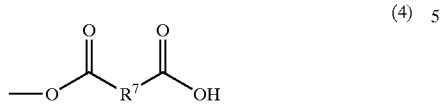
(4)

wherein $R^7$ represents a polyvalent alkyl-, alkenyl, aryl, or arylalkyl radical that may optionally contain functional groups selected from carbonyl groups, sulfone groups, ethereal oxygen groups, amine groups, and trifluoromethyl groups; and $R^8$ and $R^9$ each represent a hydrogen atom or a carboxyl group.

7. The modified carboxyl-terminated polyorganosiloxane as claimed in claim 1, wherein Y is —OCH$_2$—, —OCH(CH$_3$)—, —OCH$_2$CH$_2$—, —OCH(CH$_3$)CH$_2$—, or —OCH$_2$CH(CH$_3$)—; and X is an alkylene group having from 2 to 5 carbon atoms.

8. The modified carboxyl-terminated polyorganosiloxane as claimed in claim 4, wherein Z is a substituent of the following general formula (3):

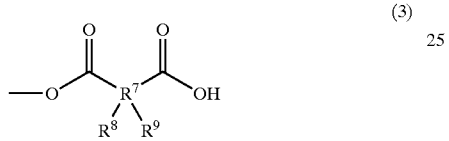
(3)

wherein $R^7$ represents a polyvalent alkyl-, alkenyl, aryl, or arylalkyl radical that may optionally contain functional groups selected from carbonyl groups, sulfone groups, ethereal oxygen groups, amine groups, and trifluoromethyl groups; and $R^8$ and $R^9$ each represent a hydrogen atom or a carboxyl group.

9. The modified carboxyl-terminated polyorganosiloxane as claimed in claim 4, wherein Z is a substituent of the following general formula (4):

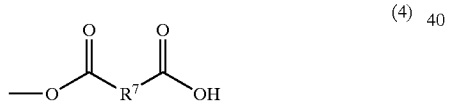
(4)

wherein $R^7$ represents a polyvalent alkyl-, alkenyl, aryl, or arylalkyl radical that may optionally contain functional groups selected from carbonyl groups, sulfone groups, ethereal oxygen groups, amine groups, and trifluoromethyl groups.

10. A method for producing a modified carboxyl-tenninated polyorganosiloxane of the following general formula (1), which comprises reacting a silicone With a hydroxyl group at one terminal position and represented by the following general formula (5), with at least one acid anhydride selected from the group of the compounds of the following general formulae (6), (7), and (8), in the presence of a catalyst:

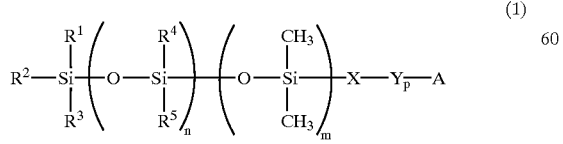
(1)

wherein $R^1$, $R^2$, $R^3$, $R^4$, and $R^5$ each represent a linear or branched alkyl group having from 1 to 20 carbon atoms, an aryl-containing group having from 6 to 10 carbon atoms, or a cycloalkyl group having from 4 to 10 carbon atoms; n and m each represent a number of 0, 1 or more; n+m indicates a number to satisfy the mean molecular weight, from 500 to 100,000, of the polysiloxane segment; X represents an alkylene group having from 2 to 20 carbon atoms; Y represents an oxyalkylene group having from 1 to 3 carbon atoms; p represents a number to satisfy the mean molecular weight, from 30 to 20,000, of the polyoxyalklene segment Yp; and A represents a substituent having from 1 to 6 carboxyl groups,

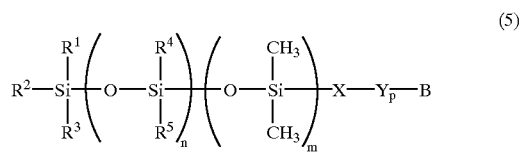
(5)

wherein $R^1$, $R^2$, $R^3$, $R^4$, and $R^5$ each represent a linear or branched alkyl group having from 1 to 20 carbon atoms, an aryl-containing group having from 6 to 10 carbon atoms, or a cycloalkyl group having from 4 to 10 carbon atoms; n and m each represent a number of 0, 1 or more; n+m indicates a number to satisfy the mean molecular weight, from 500 to 100,000, of the polysiloxane segment; X represents an alkylene group having from 2 to 20 carbon atoms; Y represents an oxyalkylene group having from 1 to 3 carbon atoms; p represents a number to satisfy the mean molecular weight, from 30 to 20,000, of the polyoxyalklene segment Yp; and B represents a substituent having from one to two hydroxyl groups,

(6)

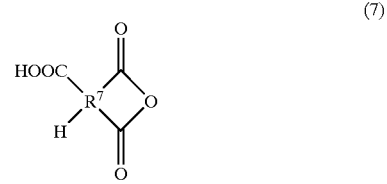
(7)

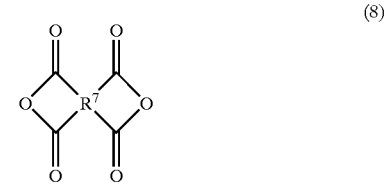
(8)

wherein $R^7$ represents a polyvalent alkyl-, alkenyl, aryl, or arylalkyl radical that may optionally contain functional groups selected from carbonyl groups, sulfone groups, ethereal oxygen groups, amine groups, and trifluoromethyl groups.

11. The method for producing a modified carboxyl-terminated polyorganosiloxane as claimed in claim 10, wherein p is a number to satisfy the mean molecular weight, from 120 to 20,000, of the polyoxyalkylene segment Yp.

12. The method for producing a modified carboxyl-terminated polyorganosiloxane as claimed in claim 10, wherein A is a substituent Z having from 1 to 3 carboxyl groups, and B is a hydroxyl group.

13. The method for producing a modified carboxyl-terminated polyorganosiloxane as claimed in claim 10, wherein A is a substituent of the following general formula (2), and B is a substituent of the following general formula (9):

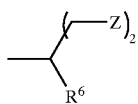

(2)

wherein $R^6$ represents a hydrogen atom, a linear or branched alkyl group having from 1 to 5 carbon atoms, or an aryl group having from 6 to 10 carbon atoms; and Z represents a substituent having from 1 to 3 carboxyl groups,

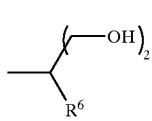

(9)

wherein $R^6$ represents a hydrogen atom, a linear or branched alkyl group having from 1 to 5 carbon atoms, or an aryl group having from 6 to 10 carbon atoms.

14. The method for producing a modified carboxyl-terminated polyorganosiloxane as claimed in claim 12, wherein Z is a substituent of the following general formula (3):

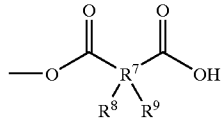

(3)

wherein $R^7$ represents a residue of a tetracarboxylic acid from which are removed the carboxyl groups; and $R^8$ and $R^9$ each represent a hydrogen atom or a carboxyl group.

15. The method for producing a modified carboxyl-terminated polyorganosiloxane as claimed in claim 12, wherein Z is a substituent of the following general formula (4):

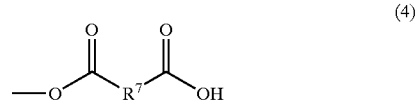

(4)

wherein $R^7$ represents a polyvalent alkyl-, alkenyl, aryl, or arylalkyl radical that may optionally contain functional groups selected from carbonyl groups, sulfone groups, ethereal oxygen groups, amine groups, and trifluoromethyl groups.

16. The method for producing a modified carboxyl-terminated polyorganosiloxane as claimed in claim 10, wherein Y is —$OCH_2$—, —$OCH(CH_3)$—, —$OCH_2CH_2$—, —$OCH(CH_3)CH_2$—, or —$OCH_2CH(CH_3)$—; and X is an alkylene group having from 2 to 5 carbon atoms.

17. The method for producing a modified carboxyl-terminated polyorganosiloxane as claimed in claim 13 wherein Z is a substituent of the following general formula (3):

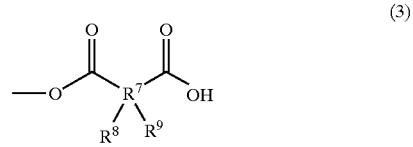

(3)

wherein $R^7$ represents a polyvalent alkyl-, alkenyl, aryl, or arylalkyl radical that may optionally contain functional groups selected from carbonyl groups, sulfone groups, ethereal oxygen groups, amine groups, and trifluoromethyl groups; and $R^8$ and $R^9$ each represent a hydrogen atom or a carboxyl group.

18. The method for producing a modified carboxyl-terminated polyorganosiloxane as claimed in claim 13, wherein Z is a substituent of the following general formula (4):

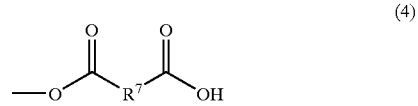

(4)

wherein $R^7$ represents a residue of a dicarboxylic acid from which are removed the carboxyl groups.

* * * * *